(12) United States Patent
Katsumata et al.

(10) Patent No.: US 11,825,135 B2
(45) Date of Patent: Nov. 21, 2023

(54) INFORMATION PROCESSING APPARATUS, INFORMATION PROCESSING METHOD, REPRODUCTION PROCESSING APPARATUS, AND REPRODUCTION PROCESSING METHOD

(71) Applicant: Sony Group Corporation, Tokyo (JP)

(72) Inventors: Mitsuru Katsumata, Tokyo (JP); Ryohei Takahashi, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/431,720

(22) PCT Filed: Jan. 29, 2020

(86) PCT No.: PCT/JP2020/003174
§ 371 (c)(1),
(2) Date: Aug. 18, 2021

(87) PCT Pub. No.: WO2020/189038
PCT Pub. Date: Sep. 24, 2020

(65) Prior Publication Data
US 2022/0159316 A1  May 19, 2022

Related U.S. Application Data

(60) Provisional application No. 62/866,334, filed on Jun. 25, 2019, provisional application No. 62/821,047, filed on Mar. 20, 2019.

(51) Int. Cl.
*H04N 21/234* (2011.01)
(52) U.S. Cl.
CPC .............. *H04N 21/234* (2013.01)

(58) Field of Classification Search
None
See application file for complete search history.

(56) References Cited

U.S. PATENT DOCUMENTS

2019/0069000 A1* 2/2019 Hou ................ H04N 21/21805
2020/0107008 A1* 4/2020 Hur .................... H04N 13/282
(Continued)

FOREIGN PATENT DOCUMENTS

JP  2007-334739 A  12/2007
WO  2018/097882 A1  5/2018

OTHER PUBLICATIONS

International Search Report and Written Opinion dated Apr. 7, 2020, received for PCT Application PCT/JP2020/003174, Filed on Jan. 29, 2020, 8 pages including English Translation.
(Continued)

*Primary Examiner* — Junior O Mendoza
(74) *Attorney, Agent, or Firm* — XSENSUS LLP

(57) ABSTRACT

To provide an information processing apparatus, an information processing method, a reproduction processing apparatus, and a reproduction processing method that provide a user with a viewing experience with a high degree of freedom. A data input unit acquires data of a three-dimensional space configured as a single spatial three-dimensional object including a plurality of three-dimensional objects. A preprocessing unit generates three-dimensional object-specifying information for identifying a specific three-dimensional object included in a three-dimensional space. A file generation unit generates a file including data of a three-dimensional space and three-dimensional object-specifying information generated by the preprocessing unit.

13 Claims, 33 Drawing Sheets

(56) References Cited

U.S. PATENT DOCUMENTS

2020/0389676 A1* 12/2020 Denoual ............ H04N 21/8456
2021/0264641 A1* 8/2021 Iguchi .................. H04N 19/436

OTHER PUBLICATIONS

"Information Technology—Coding of Audio-Visual Objects", Part12 : ISO Base Media File Format, ISO/IEC 14496-12:2015 [E], Dec. 15, 2015, pp. 1-233.

* cited by examiner

FIG. 4

```
ObjectMetadata[
    exposedFiled    SFVec3f      centerPoint          0, 0, 0
    field           SFVec3f      bboxSize             -1 -1 -1 # (0,∞) or -1, -1,-1
    field           SFInt32      id                   0
    field           SFString     description          ""
```

FIG. 5

```
Transform [
    eventIn         MFNode       addChildren
    eventIn         MFNode       removeChildren
    exposedField    SFVec3f      center               0,0,0
    exposedField    MFNode       children             []
    exposedField    SFRotation   rotation             0,0,1,0
    exposedField    SFVec3f      scale                1,1,1
    exposedField    SFRotation   scaleOrientation     0,0,1,0
    exposedField    SFVec3f      translation          0,0,0
    field           SFVec3f      bboxCenter           0,0,0
    field           SFVec3f      bboxSize             -1,-1,-1
    field           SFInt32      id                   0
    field           SFbool       noShapeFlag          0
    field           SFString     description          ""
}
```

FIG. 9

```
<complexType name="SD:Visual3DObjectInfo">
        <sequence>
                <element name="Object3D" type="Object3DInfo"/>
        </sequence>
</complexType>

<complexType name="Object3DInfo">
        <sequence>
                <element name="id" type="float" maxOccurs="1"/>
                <element name="centerPointX" type="float" maxOccurs="1"/>
                <element name="centerPointY" type="float" maxOccurs="1"/>
                <element name="centerPointZ" type="float" maxOccurs="1"/>
                <element name="bboxSizeX" type="float" maxOccurs="1"/>
                <element name="bboxSizeY" type="float" maxOccurs="1"/>
                <element name="bboxSizeZ" type="float" maxOccurs="1"/>
                <element name="description" type="string" maxOccurs="1"/>
        </sequence>
</complexType>
```

FIG. 10

```
aligned(8) class objectmetadata () {
    unsinged int (32) num_of_objects;
    for (i=0; i<num_of_objects; i++) {
        unsigned int (32) object_id;
        unsigned int (32) centerPointX;
        unsigned int (32) centerPointY;
        unsigned int (32) centerPointZ;
        unsigned int (32) bboxSizeX;
        unsigned int (32) bboxSizeY;
        unsigned int (32) bboxSizeZ;
        string description;
    }
}
```

*FIG. 11*

```
aligned (8) class StaticObjectMetadataBox () extends Box(`somd`){
  SceneDescriptionObjectMetadata () ;
} syntax
  SceneDescriptionObjectMetadata() :      BINARIZED DATA OF Scene Description
IN MPEG-4 Scene Description FORMAT
```

FIG. 15

```
<SupplementalProperty schemeIdUri="StaticObjectMetadata">
  <SOMmeta id="1" centerPointX="25" centerPointY="0" centerPointZ="0" bboxSizeX="50" bboxSizeY="50" bboxSizeZ="50" description="player1">
  <SOMmeta id="2" centerPointX="-25" centerPointY="0" centerPointZ="0" bboxSizeX="50" bboxSizeY="50" bboxSizeZ="50" description="player2">
</SupplementalProperty>
```

FIG. 16

```
# MPD EXAMPLE
<Period>
//Scene Description
  <AdaptationSet>
    <Representation id="100" bandwidth="500000"><BaseURL> SD.ISOBMFF </BaseURL></Representation>
  </AdaptationSet>
//MESH DATA OF SPACE DATA
  <AdaptationSet>
    <Representation id="1" bandwidth="20000000"><BaseURL> mesh-1.ISOBMFF </BaseURL></Representation>
    <Representation id="2" bandwidth="10000000"><BaseURL> mesh-2.ISOBMFF </BaseURL></Representation>
  </AdaptationSet>
//TEXTURE DATA OF SPACE DATA
  <AdaptationSet>
    <Representation id="3" bandwidth="5000000"><BaseURL> texture-1.ISOBMFF </BaseURL></Representation>
    <Representation id="4" bandwidth="1000000"><BaseURL> texture-2.ISOBMFF </BaseURL></Representation>
  </AdaptationSet>
//3D OBJECT METADATA
  <AdaptationSet codecs="obmt">
    <Representation id="5" bandwidth="5000000" objectmeta=1.ISOBMFF associationId="100" associationType="cdsc">
      <BaseURL> </BaseURL>
    </Representation>
  </AdaptationSet>
</Period>
```

FIG. 17

```
HighLODObject {
        field         MFInt32        ids        □
}
```

FIG. 18

```
HighLODObject {
        field         MFInt32        ids        □
        field         MFInt32        quality    □
}
```

FIG. 19

```
<complexType name=" SD:Visual3DObjectLODInfo">
        <sequence>
                <element name="Object3DLOD" type="Object3DLODInfo"/>
        </sequence>
</complexType>

<complexType name="Object3DLODInfo">
        <sequence>
                <element name ="id" type="integer" maxOccurs="1"/>
        </sequence>
</complexType>
```

FIG. 20

```
<complexType name=" SD:Visual3DObjectLODInfo">
        <sequence>
                <element name="Object3DLOD" type="Object3DLODInfo"/>
        </sequence>
</complexType>

<complexType name="Object3DLODInfo">
        <sequence>
                <element name ="id" type=" integer" maxOccurs="1"/>
                <element name = "quality" type=" integer" maxOccurs="1"/>
        </sequence>
</complexType>
```

FIG. 21

```
aligned (8) class HighQualityobject () {
  unsigned int (32)    num_object;
  for(i=0; i<num_object; i++) {
    unsigned int (32)  High_LOD_object_id;
  }
}
```

FIG. 22

```
aligned (8) class HighQualityobject () {
  unsigned int (32)    num_object;
  for(i=0; i<num_object; i++) {
    unsigned int (32) object_id;
    unsigned int (32) LOD_value;
}}
```

FIG. 23

```
aligned (8) class StaticHighLODObjectBox() extends Box('shlo') {
  SceneDescriptionHighLODObject ();
} syntax
  SceneDescriptionHighLODObject ():        BINARIZED DATA OF Scene Description
IN MPEG-4 Scene Description FORMAT
```

FIG. 24

```
<SupplennentalProperty schemeIdUri="StaticHighLODObject">
  <SLO:HigLOD objectMetadata="xx" >
    <SLO:objectList id="1" />
  </SLO:HigLOD>
</SupplementalProperty>
```

FIG. 25

```
BitWrapper {
  field  SFNode    node   NULL
  field  SFInt32   type   0
  field  MFString  url    AdaptationSetIdSelection []
  field  MFString  buffer ""
  field  SFString
}
```
⌞36

```
MovieTexture {
  exposedField  SFBool    loop              FALSE
  exposedField  SFFloat   speed             1.0
  exposedField  SFTime    startTime         0
  exposedField  SFTime    stopTime          0
  field         MFString  url
  field         MFString  AdaptationSetIdSelection []
  field         SFBool    repeatS           TRUE
  field         SFBool    repeatT           TRUE
  eventOut      SFTime    duration_changed
  eventOut      SFBool    isActive
}
```
⌞37

FIG. 29

```
Switch {
        exposedField  MFNode    choice         []
        exposedField  SFInt32   whichChoice    -1
        field         MFString  ContentStruct  []
}
```

FIG. 30

```
aligned (8) class ContentStruct () {
  umsigned int (32) num_contentStruct;
    for(k=0; k< num_contentStruct; k++) {
      unsigned int (32) num_3Dobject;
      for(j=0; j< num_3Dobject; j++) {
        unsigned int (32) num_includingObject;
        for(i=0; i< num_includingObject; i++) {
          unsigned int (32)         including_object_id.
        }
      }
    }
}
aligned(8) class ContentStructBox() extends Box('cost') {
  ContentStruct ()
}
```

FIG. 31

```
IncludingObjectMetadata {  // INFORMATION OF OBJECT INCLUDED
    field    MFInt32    id    []
        // 3D OBJECT-SPECIFYING INFORMATION    id INCLUDED IN OBJECT-SPECIFYING INFORMATION OF ENTIRE SCENE IS USED
}
```

FIG. 32

```
<SupplementalProperty schemeIdUri="IncludingObjectMetadata">
  <IOM:NOobjectMetadata="xx" ids="2 3 4"/>
</SupplementalProperty>
```

FIG. 33

```
aligned (8) class IncludingObject () {
  unsigned int (32) num_includingObject;
  for(i=0; i< num_includingObject; i++) {
    unsigned int (32) including_object_id;
  }
}
aligned(8) class IncludingObjectBox () extends Box (`inob`) {
  IncludingObject ();
}
```

FIG. 35

```
<SupplementalProperty schemeIdUri="6DoFContentStruct">//CONFIGURATION 1
    <OM objectMetadata="xx"/>
    <3DObject ids="1"/>
    <3DObject ids="2 3 4"/>
</SupplementalProperty>
<SupplementalProperty schemeIdUri="6DoFContentStruct"> //CONFIGURATION 2
    <OM objectMetadata="xx"/>
    <3DObject ids="2">//3D OBJECT-SPECIFYING INFORMATION INCLUDED FOR EACH 3D OBJECT
    <3DObject ids="1 3 4">//SPACE SEPARATION IN CASE OF INCLUDING PLURALITY
</SupplementalProperty>
```

```
NoticeableObject {
        field           MFInt32    ids      []
}
```

*FIG. 38*

```
NoticeableObject {
        field           MFInt32    ids      []
        field           MFInt32    level    []
}
```

FIG. 39

```
<complexType name=" SD:VisualNoticeable3DObjectInfo">
    <sequence>
        <element name="Noticeable3DObject" type="Noticeable3DObjectInfo"/>
    </sequence>
</complexType>
<complexType name="Noticeable3DObjectInfo">
    <sequence>
        <element name="id" type="integer" maxOccurs="1"/>
    </sequence>
</complexType>
```

FIG. 40

```
<complexType name=" SD: VisualNoticeable3DObjectInfo ">
    <sequence>
        <element name=" Noticeable3DObject LOD" type=" Noticeable3DObjectInfo"/>
    </sequence>
</complexType>
<complexType name=" Noticeable3DObjectInfo">
    <sequence>
        <element name ="id" type=" integer" maxOccurs="1"/>
        <element name ="level" type=" integer" maxOccurs="1"/>
    </sequence>
</complexType>
```

*FIG. 41*

```
aligned (8) class NoticeableObject () {
    unsigned int (32)   num_object;
    for(i=0; i<num_object; i++) {
        unsigned int (32) noticeable_object_id;
    }
}
```

*FIG. 42*

```
aligned(8) class NoticeableObject () {
    unsigned int (32)   num_object;
    for(i=0; i<num_object; i++) {
        unsigned int (32) noticeable_object_id;
        unsigned int (32) level;
    }
}
```

FIG. 43

```
aligned(8) class StaticNoticeableObjectBox() extends Box('noob'){
   StaticNoticeableObjectStruct();
} syntax
   StaticNoticeableObjectStruct();       BINARIZED DATA OF Scene Description IN
MPEG-4 Scene Description FORMAT
```

FIG. 44

```
<SupplementalProperty schemeIdUri="StaticNoticeableObject">
  <SNO:NO objectMetadata="xx">
    <SNO:objectList id="1"/>
  </SNO:NO>
</SupplemnentalProperty>
```

INFORMATION PROCESSING APPARATUS, INFORMATION PROCESSING METHOD, REPRODUCTION PROCESSING APPARATUS, AND REPRODUCTION PROCESSING METHOD

CROSS-REFERENCE TO RELATED APPLICATIONS

The present application is based on PCT filing PCT/JP2020/003174, filed Jan. 29, 2020, which claims priority to U.S. Provisional Patent Application No. 62/821,047, filed Mar. 20, 2019, and claims priority to U.S. Provisional Patent Application No. 62/866,334, filed Jun. 25, 2019, the entire contents of each are incorporated herein by reference.

TECHNICAL FIELD

The present disclosure relates to an information processing apparatus, an information processing method, a reproduction processing apparatus, and a reproduction processing method.

BACKGROUND ART

In the current video distribution, the distribution of two-dimensional content called two-dimensional video used for distribution of movies and the like is the mainstream. Moreover, the distribution of 360-degree videos that enable looking around in all directions is also provided on various sites on the Internet. The 360-degree video is also called 3 degrees of freedom (DoF) video. For both two-dimensional videos and 3DoF videos, basically two-dimensional encoded content is distributed and displayed on a client apparatus.

On the other hand, distribution of 6DoF content has been proposed as a video with even more degree of freedom. 6DoF content can be looked around in all directions by freely selecting the line-of-sight direction in the three-dimensional space, and furthermore it is possible to freely select the position in the space by freely selecting the viewpoint position. 6DoF content is three-dimensional content that expresses a three-dimensional object in a three-dimensional space and allows the viewpoint direction and the viewpoint position to be freely set during reproduction. 6DoF content expresses a three-dimensional space with one or a plurality of three-dimensional objects. Hereinafter, the three-dimensional object is referred to as a 3D object.

More specifically, the 6DoF content expresses a three-dimensional space using a three-dimensional object for each time by the method described below. One method is an object-based expression method that expresses a three-dimensional space with a three-dimensional object for each object such as a person or a thing. Furthermore, another method is a space-based expression method that expresses the entire object space as one three-dimensional object without generating a three-dimensional object for each object such as a person or a thing.

In live streaming of 6DoF content based on live-action sports and music, using a space-based expression method facilitates content production and keeps the processing cost of a client apparatus low. Then, in a case where the space-based expression method is used, the end-to-end delay can be reduced.

As a method of distributing 6DoF content, for example, there is a method of configuring a three-dimensional space with a plurality of three-dimensional objects and propagating as a plurality of object streams. When distributing 6DoF content by such a method, for example, there is a technique of using a description method called a scene description. As a scene description, there is a technique of expressing a scene with a graph having a tree hierarchical structure called a scene graph and expressing the scene graph in a binary format or a text format.

CITATION LIST

Non-Patent Document

Non-Patent Document 1: "ISO/IEC 14496-12:2015", Information technology. Coding of audio-visual objects. Part 12: ISO base media file format, 2015-12

SUMMARY OF THE INVENTION

Problems to be Solved by the Invention

However, in the case of 6DoF content using the space-based expression method, it is difficult to identify the object, and the user has little degree of freedom to determine a viewing experience.

Therefore, the present disclosure provides an information processing apparatus, an information processing method, a reproduction processing apparatus, and a reproduction processing method that can provide a user with a viewing experience with a high degree of freedom.

Solutions to Problems

According to the present disclosure, in a spatial three-dimensional object that constitutes a three-dimensional space with a plurality of objects as a single three-dimensional object, a preprocessing unit generates object-specifying information for identifying a specific object included in the three-dimensional space. A file generation unit generates a file including data of the spatial three-dimensional object and the object-specifying information.

BRIEF DESCRIPTION OF DRAWINGS

FIG. 4 is a diagram indicating an example of the syntax of an object metadata node.

FIG. 5 is a diagram showing an example of the syntax in a case where an existing node is extended and three-dimensional object-specifying information is stored.

FIG. 9 is a diagram indicating an example of the syntax in a case where three-dimensional object-specifying information is stored in a user description format.

FIG. 10 is a diagram indicating an example of the syntax in a case where three-dimensional object-specifying information is stored in a unique format.

FIG. 11 is a diagram showing an example of a box for storing data indicating three-dimensional object-specifying information in variation example (2-1) of the first embodiment.

FIG. 15 is a diagram indicating an example of the syntax of AdaptationSet according to variation example (3-1) of the first embodiment.

FIG. 16 is a diagram indicating an example of the syntax of MDP in variation example (3-2) of the first embodiment.

FIG. 17 is a diagram indicating an example of sytax of a node of a scene graph including high-definition three-dimensional object information.

FIG. 18 is a diagram indicating an example of the syntax indicating definition together with a high-definition three-dimensional object.

FIG. 19 is a diagram indicating an example of the syntax in a case where high-definition three-dimensional object-specifying information is stored in a user description format.

FIG. 20 is a diagram indicating an example of the syntax in a case where definition is stored together with a high-definition three-dimensional object in a user description format.

FIG. 21 is a diagram indicating an example of the syntax in a case where high-definition three-dimensional object-specifying information is stored in a unique format.

FIG. 22 is a diagram indicating an example of the syntax in a case where definition is stored together with a high-definition three-dimensional object in a unique format.

FIG. 23 is a diagram showing an example of a box for storing data indicating high-definition three-dimensional object-specifying information in variation example (2-1) of the second embodiment.

FIG. 24 is a diagram indicating an example of the syntax of AdaptationSet according to variation example (3-1) of the second embodiment.

FIG. 25 is a diagram showing an extended scene description according to variation example (4) of the second embodiment.

FIG. 29 is a diagram indicating an example of the syntax of an extended Switch node.

FIG. 30 is a diagram indicating an example of the syntax of ContentsStructureBox.

FIG. 31 is a diagram indicating an example of the syntax of an IncludingObjectMetadata node.

FIG. 32 is a diagram indicating an example of IncludingObjectMetadata.

FIG. 33 is a diagram indicating an example of IncludingObjectBox.

FIG. 35 is a diagram indicating an example of the syntax of three-dimensional object-specifying information for each three-dimensional object included in each configuration stored in AdaptationSet.

FIG. 36 is a diagram indicating a scene graph in a case where the scene description of each configuration is divided.

FIG. 37 is a diagram indicating an example of the syntax of a node of noticeable object information.

FIG. 38 is a diagram indicating an example of the syntax showing noticeability together with noticeable object information.

FIG. 39 is a diagram indicating an example of the syntax in a case where noticeable object information is stored in a user description format.

FIG. 40 is a diagram indicating an example of the syntax in a case where noticeability is shown together with noticeable object information in a user description format.

FIG. 41 is a diagram indicating an example of the syntax in a case where noticeable object information is stored in a unique format.

FIG. 42 is a diagram indicating an example of the syntax in a case where noticeability is shown together with noticeable object information in a unique format.

FIG. 43 is a diagram showing an example of a box for storing data indicating noticeable object information in variation example (2-1) of the third embodiment.

FIG. 44 is a diagram indicating an example of the syntax of MPD for storing noticeable object information.

MODE FOR CARRYING OUT THE INVENTION

Figure 1:
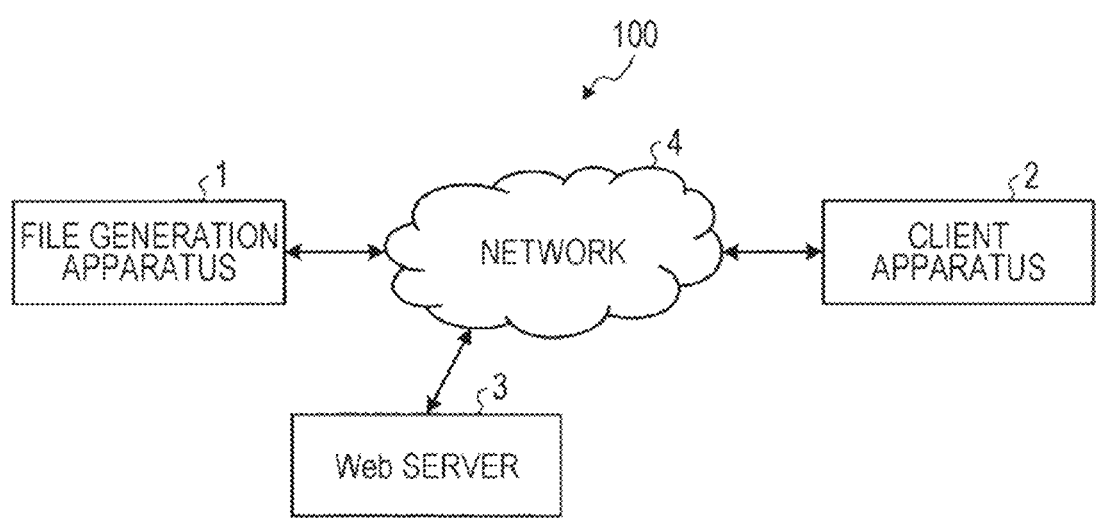
FIG. 1 is a system configuration diagram of an example of a distribution system.

Embodiments of the present disclosure will be described in detail below on the basis of the drawings. Note that in each of the embodiments below, the same parts are designated by the same reference numerals and duplicate description will be omitted. Note that the scope disclosed in the present technology is not limited to the contents of the embodiments, but also includes the contents described in the following non-patent documents known at the time of filing.

Non-Patent Document 1: (above)

Non-Patent Document 2: "ISO/IEC 14496-11:2015", Information technology. Coding of audio-visual objects. Part 11: Sene description and application engine, 2015-11

Non-Patent Document 3: "ISO/IEC 23009-1:2014", Information technology. Dynamic adaptive streaming over HTTP (DASH), Part 1: Media presentation description and segment formats, 2014-15

Non-Patent Document 4: "ISO/IEC 23009-1:2014", Information technology. Dynamic adaptive streaming over HTTP (DASH), Part 1: AMENDMENT 2: Spatial relationship description generalized URL parameters and other extensions, 2014-05

Non-Patent Document 5: "ISO/IEC 21000-22:2016", Information technology-Multimedia framework (MPEG-21)-Part 22: User Description, 2016-11

That is, the contents described in the above-mentioned non-patent documents are also incorporated in the present specification by reference. That is, the contents described in the above-mentioned non-patent documents are also the basis for determining the support requirement. For example, even in a case where File Structure described in Non-Patent Document 1, the structure/term used in Scene Description described in Non-Patent Document 2, and the term used in the MPEG-DASH standard described in Non-Patent Document 3 are not directly described in the detailed description of the invention, they are within the scope of the disclosure of the present technology and satisfy the support requirement of the claims. Furthermore, for example, similarly regarding technical terms such as Parsing, Syntax, and Semantics, even in a case where there is no direct description in the detailed description of the invention, they are within the scope of the disclosure of the present technology and satisfy the support requirement of the claims.

Furthermore, the present disclosure will be described according to the order of items shown below.
1. First embodiment
1.1-1 Variation example (1-1) of the first embodiment
1.1-2 Variation example (1-2) of the first embodiment
1.2-1 Variation example (2-1) of the first embodiment
1.2-2 Variation example (2-2) of the first embodiment
1.2-3 Variation example (2-3) of the first embodiment
1.3-1 Variation example (3-1) of the first embodiment
1.3-2 Variation example (3-2) of the first embodiment
2. Second embodiment
2.1-1 Variation example (1-1) of the second embodiment
2.1-2 Variation example (1-2) of the second embodiment
2.2-1 Variation example (2-1) of the second embodiment
2.2-2 Variation example (2-2) of the second embodiment
2.3-1 Variation example (3-1) of the second embodiment
2.3-2 Variation example (3-2) of the second embodiment
2.4 Variation example (4) of the second embodiment
2.5 Variation example (5) of the second embodiment
2.6 Variation example (6) of the second embodiment
2.7-1 Variation example (7-1) of the second embodiment
2.7-2 Variation example (7-2) of the second embodiment
3. Third embodiment
3.1-1 Variation example (1-1) of the third embodiment
3.1-2 Variation example (1-2) of the third embodiment
3.2-1 Variation example (2-1) of the third embodiment
3.2-2 Variation example (2-2) of the third embodiment
3.3-1 Variation example (3-1) of the third embodiment
3.3-2 Variation example (3-2) of the third embodiment

1. FIRST EMBODIMENT

As described above, the space-based expression method is effective for 6DoF content based on live-action sports and music. However, in a case where the space-based expression method is used, it is difficult to identify each object included in the 6DoF content, and the degree of freedom for the user to determine a viewing experience is small. Specifically, the object-based expression method has the restrictions described below as compared with the object-based expression method. In viewing in which the viewpoint is freely selected, it is difficult for the client apparatus to automatically track and view the object designated by the user. Furthermore, it is difficult to display the position of the object on the client apparatus to assist the viewing of the user. Moreover, it is difficult to display only an object designated by the user in a high quality manner. Furthermore, in a designated viewing such as region of interest (ROI), it is difficult to show the user a noticeable object intended by the content creator or causes the user to track and view the noticeable object, and moreover, it is difficult to display only such an object in a high quality manner. Thus, the information processing apparatus and the reproduction processing apparatus described below are provided.

Configuration of the System According to the First Embodiment

FIG. 1 is a system configuration diagram of an example of a distribution system. A distribution system 100 includes a file generation apparatus 1, which is an information processing apparatus, a client apparatus 2, which is a reproduction processing apparatus, and a Web server 3. The file generation apparatus 1, the client apparatus 2, and the Web server 3 are connected to a network 4. Then, the file generation apparatus 1, the client apparatus 2, and the Web server 3 can communicate with each other via the network 4. Here, although the apparatuses are shown one by one in FIG. 1, the distribution system 100 may include a plurality of file generation apparatuses 1 and a plurality of client apparatuses 2.

The file generation apparatus 1 generates 6DoF content. The file generation apparatus 1 uploads the generated 6DoF content to the Web server 3. Here, in the present embodiment, the configuration in which the Web server 3 provides the client apparatus 2 with the 6DoF content will be described, but the distribution system 100 can also adopt another configuration. For example, it may be the configuration in which the file generation apparatus 1 includes the function of the Web server 3, stores the generated 6DoF content in its own apparatus, and provides it to the client apparatus 2.

The Web server 3 holds the 6DoF content uploaded from the file generation apparatus 1. Then, the Web server 3 provides the designated 6DoF content according to a request from the client apparatus 2.

The client apparatus 2 transmits a 6DoF content transmission request to the Web server 3. Then, the client apparatus 2 acquires the 6DoF content designated by the transmission request from the Web server 3. Then, the client apparatus 2 decodes the 6DoF content, generates a video, and displays the video on a display apparatus such as a monitor.

Here, the 6DoF content will be described. 6DoF content expresses a three-dimensional space with one or a plurality of three-dimensional objects. The 3D object is expressed using the coordinate system in normalized Bounding Box, which is the local coordinate system of the 6DoF content, and is compressed and encoded into a bitstream. Scene Description is used to arrange this bitstream in a three-dimensional space.

There are multiple standards for this scene description. Basically, the scene displaying each 3D object at each time is expressed by a graph with a tree hierarchical structure called a scene graph, and the scene graph is expressed in a binary format or a text format. Here, the scene graph is spatial display control information, and is configured by defining information regarding the display of a 3D object in configuration units of node and combining a plurality of nodes hierarchically. Nodes include a node for coordinate conversion information that converts one coordinate system to another coordinate system, a node for position information and size information of a 3D object, and a node for access information to a 3D object and audio data.

Note that, in the following, the 6DoF content includes scene description data, which is spatial display control information, and media data of a plurality of 3D objects (expressed, for example, as a combination of mesh data and texture data of 3D objects). Furthermore, the 6DoF content may include audio data. Other formats such as Point Cloud can be applied to the media data of 3D objects. Furthermore, the scene description data shall comply with MPEG-4 Scene Description (ISO/IEC 14496-11).

MPEG-4 Scene Description data is obtained as the scene graph is binarized in the format of binary format for scenes (BIFS). The conversion of this scene graph to BIFS is possible by using a predetermined algorithm. Furthermore, by storing in ISO base media file format (ISOBMFF), it is possible to specify the scene for each time, and it is possible to express a 3D object whose position and size change.

Figure 2:
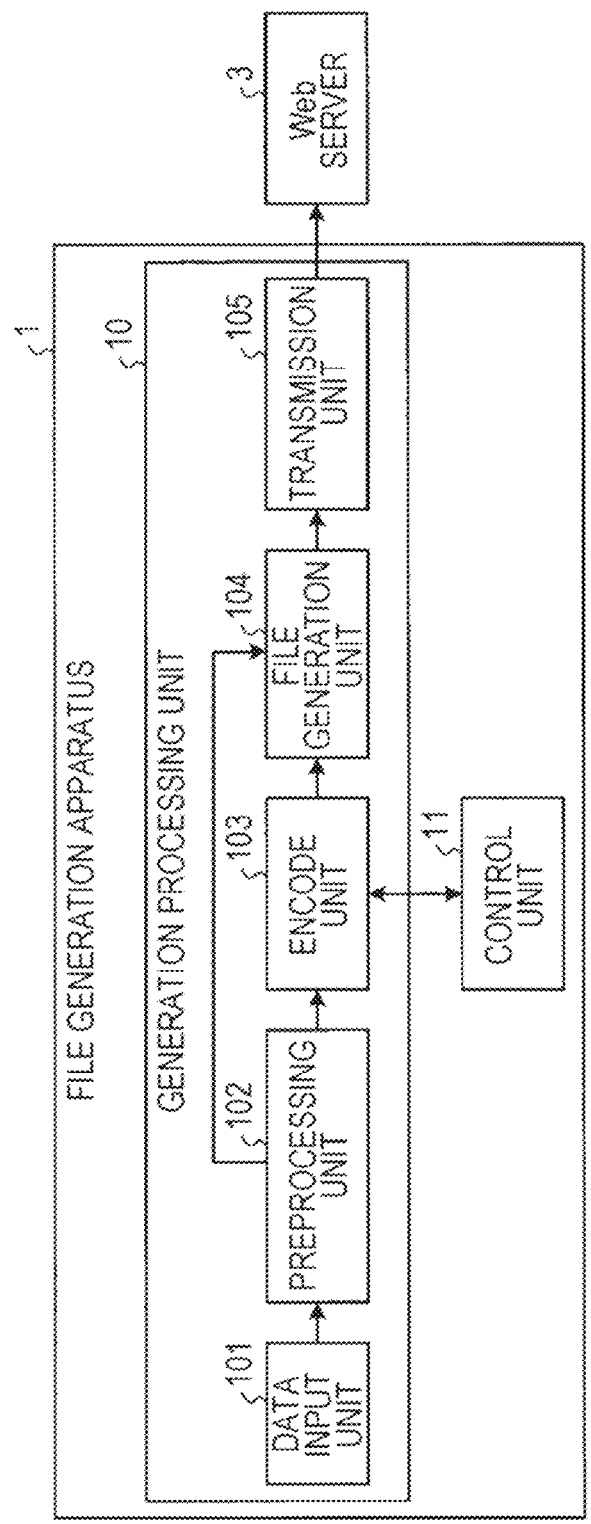
FIG. 2 is a block diagram of a file generation apparatus.

Configuration of the File Generation Apparatus According to the First Embodiment Next, the details of the file generation apparatus 1 will be described. FIG. 2 is a block diagram of the file generation apparatus. As shown in FIG. 2, the file generation apparatus 1, which is an information processing apparatus, includes a generation processing unit 10 and a control unit 11. The control unit 11 executes processing related to the control of the generation processing unit 10. For example, the control unit 11 performs comprehensible control of, for example, the operation timing of each unit of the generation processing unit 10. The generation processing unit 10 includes a data input unit 101, a preprocessing unit 102, an encode unit 103, a file generation unit 104, and a transmission unit 105.

The data input unit 101 receives input of original information for generating a three-dimensional object, meta information, and the like. The data input unit 101 outputs the acquired original information to the preprocessing unit 102. The data input unit 101 receives data input. The data received by the data input unit 101 includes metadata such as a 3D object and arrangement information of the 3D object. The data input unit 101 outputs the acquired data to the preprocessing unit 102.

The preprocessing unit 102 receives input of data including metadata such as a 3D object and arrangement information of the 3D object from the data input unit 101. Then, the preprocessing unit 102 determines the bitstream configuration on the basis of the acquired data, and generates a scene graph using the metadata of each 3D object and the access information to the bitstream. Furthermore, the metadata includes control information such as what kind of codec is used for compression.

The preprocessing unit 102 generates three-dimensional object-specifying information for specifying a three-dimensional object in the three-dimensional space. The three-dimensional object-specifying information includes identification information for determining the same three-dimensional object, spatial position information of the three-dimensional object, detailed information of the three-dimensional object, and the like, even when the time changes. This three-dimensional object-specifying information corresponds to an example of the "object-specifying information".

Figure 3:
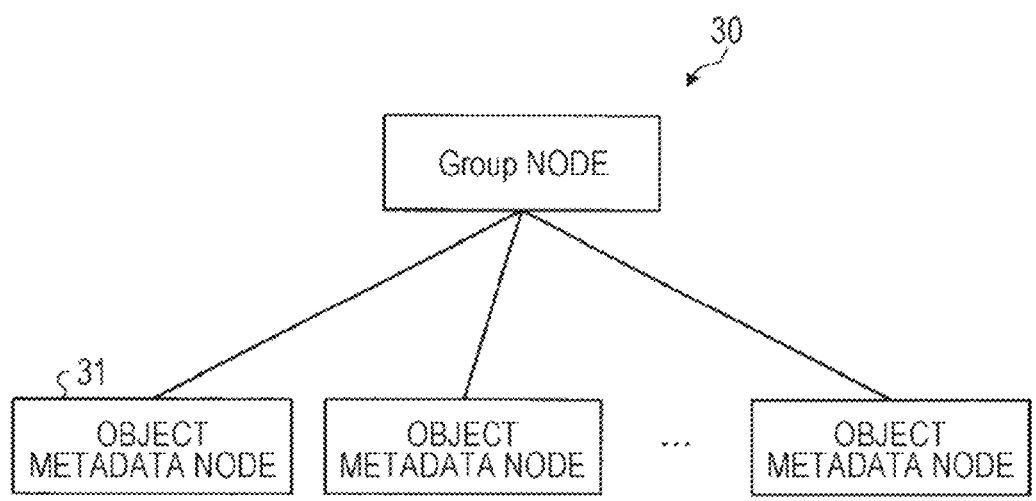
FIG. 3 is a diagram indicating a storage state of three-dimensional object-specifying information according to the first embodiment.

Here, the preprocessing unit 102 according to the present embodiment stores the three-dimensional object-specifying information in the scene description format. FIG. 3 is a diagram indicating a storage state of three-dimensional object-specifying information according to the first embodiment. For example, the preprocessing unit 102 defines a new object metadata node 31 for showing identification information, position information of the three-dimensional object, and detailed information of the three-dimensional object, as shown in FIG. 3. Then, the preprocessing unit 102 generates a scene graph 30 having the object metadata node 31 for each three-dimensional object as a child node while using a Group node as the root for the three-dimensional object-specifying information at a certain time. In this case, the preprocessing unit 102 sets each object metadata node 31 indicating the three-dimensional object-specifying information of each three-dimensional object as a child node of the Group node.

FIG. 4 is a diagram indicating an example of the syntax of an object metadata node. For example, the preprocessing unit 102 generates the object metadata node 31 using the syntax shown in FIG. 4. In the syntax shown in FIG. 4, centerPoint is a value indicating the coordinates (x, y, z) indicating the center of a three-dimensional object. Furthermore, bboxSize is a value indicating the circumscribed box of a three-dimensional object, and is indicated by a length parallel to each axis about centerPoint. In a case where centerPoint is used and bboxSize is not used, that is, when bboxSize is omitted, bboxSize is set to (−1, −1, −1). id is the identification information of the three-dimensional object, and is indicated by a numerical value in the present embodiment. description is a character string showing detailed information of the three-dimensional object.

Although the case of defining a new node has been described above, the preprocessing unit 102 can also extend an existing node to store the three-dimensional object-specifying information. FIG. 5 is a diagram showing an example of the syntax in a case where an existing node is extended and three-dimensional object-specifying information is stored. For example, the preprocessing unit 102 indicates the position of the three-dimensional object using existing bboxCenter field and bboxSize field in a Transform node indicated as exposedField in FIG. 5. Furthermore, the preprocessing unit 102 realizes the storage of the identification information and the detailed information of the three-dimensional object by extending field in the Transform node. In the syntax shown in FIG. 4, id is identification information of the three-dimensional object and is indicated by a numerical value. Furthermore, noShapeFlag indicates that there is no data indicating the shape of the three-dimensional object in the child node, that is, there is only the position information. Furthermore, description is a character string indicating detailed information of the three-dimensional object. Furthermore, although the case of extending the Transform node has been described here, it is also possible to extend another node and store the three-dimensional object-specifying information.

Moreover, in the above, the circumscribed box of the three-dimensional object is used to indicate the position of the three-dimensional object, but the preprocessing unit 102 may indicate the position of the three-dimensional object by a solid such as a circumscribed sphere or a circumscribed cylinder. In addition, the preprocessing unit 102 may store the shape information itself of the three-dimensional object.

The preprocessing unit 102 outputs the three-dimensional object and the generated scene graph to the encode unit 103. Furthermore, the preprocessing unit 102 outputs the metadata to the file generation unit 104.

The encode unit 103 receives the input of the three-dimensional object and the scene graph from the preprocessing unit 102. Then, the encode unit 103 encodes the three-dimensional object and generates a bitstream. Furthermore, the encode unit 103 encodes the acquired scene graph and generates a scene description. Thereafter, the encode unit 103 outputs the generated bitstream and scene description to the file generation unit 104.

The file generation unit 104 receives the input of the bitstream and scene description from the encode unit 103. Furthermore, the file generation unit 104 receives the input of metadata from the preprocessing unit 102. Then, the file generation unit 104 creates a file by storing the acquired bitstream in the ISOBMFF file for each segment, and generates a segment file of the bitstream. Furthermore, the file generation unit 104 creates a file by storing the data of the scene description in the ISOBMFF file for each segment, and generates a segment file of the scene description.

Furthermore, the file generation unit 104 generates a media presentation description (MPD) file on the basis of the data acquired from the preprocessing unit 102. The MPD file stores meta information of 6DoF content such as media type, moving image and audio segment file information.

The transmission unit 105 acquires the segment files of the bitstream, a static scene description, and a dynamic scene description from the file generation unit 104, and transmits and uploads them to the Web server 3.

Configuration of the Client Apparatus According to the First Embodiment

Figure 6:
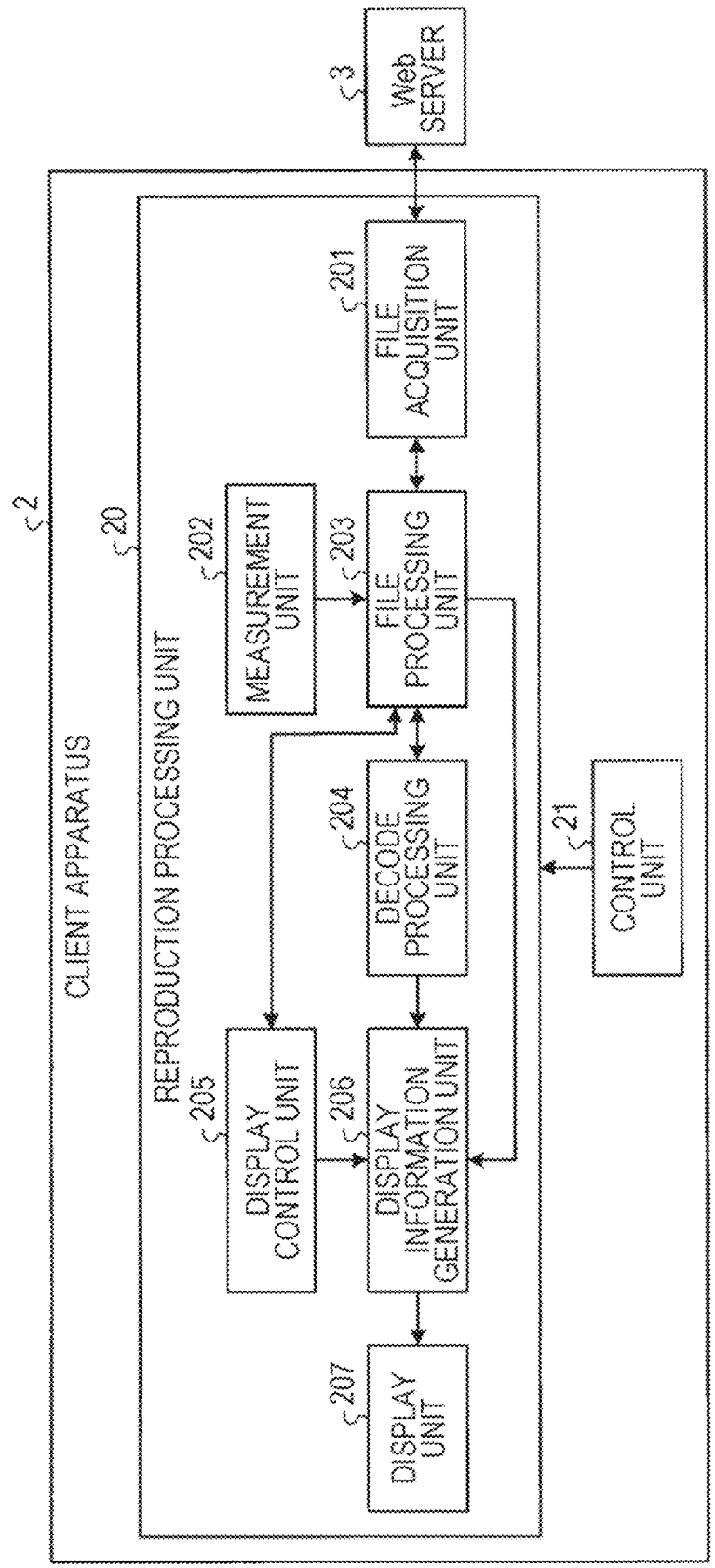
FIG. 6 is a block diagram of a client apparatus.

FIG. 6 is a block diagram of the client apparatus. As shown in FIG. 6, the client apparatus 2 includes a reproduction processing unit 20 and a control unit 21. The control unit 21 controls the operation of each unit of the reproduction processing unit 20. For example, the control unit 21 comprehensively controls the timing of operation of each unit of the reproduction processing unit 20. The reproduction processing unit 20 includes a file acquisition unit 201, a measurement unit 202, a file processing unit 203, a decode processing unit 204, a display control unit 205, a display information generation unit 206, and a display unit 207.

The file acquisition unit 201 acquires the MPD file corresponding to the 6DoF content to be reproduced from the Web server 3. Then, the file acquisition unit 201 acquires the information of the scene description of the 6DoF content to be reproduced on the basis of the MPD file.

The file acquisition unit 201 acquires an ISOBMFF file in which the scene description of the 6DoF content to be displayed is stored by accessing the Web server 3. Then, the file acquisition unit 201 outputs the ISOBMFF file in which the scene description is stored to the file processing unit 203.

Moreover, the file acquisition unit 201 acquires the information of the bitstream selected by the file processing unit 203 from the file processing unit 203. Then, the file acquisition unit 201 accesses the Web server 3 and acquires the segment file of the selected bitstream. Thereafter, the file acquisition unit 201 outputs the segment file of the acquired bitstream to the file processing unit 203.

The measurement unit 202 measures the transmission band of a transmission path between the client apparatus 2 and the WEB server. Then, the measurement unit 202 outputs the measurement result of the transmission band to the file processing unit 203.

The file processing unit 203 receives the input of the MPD file corresponding to the 6DoF content to be reproduced from the file acquisition unit 201. Then, the file processing unit 203 parses the acquired MPD file and acquires the scene description of the 6DoF content to be reproduced. Furthermore, the file processing unit 203 also recognizes a plurality of pieces of data used for adaptive distribution. For example, in the case of adaptive distribution in which the bit rate is switched, the information of the segment file of the bitstream corresponding to each bit rate is acquired. In this case, the file processing unit 203 outputs the information of the scene description of the 6DoF content to be reproduced to the file acquisition unit 201.

The file processing unit 203 receives the input of the ISOBMFF file in which the scene description is stored from the file acquisition unit 201. The file processing unit 203 parses the acquired ISOBMFF file. Then, the file processing unit 203 acquires the coordinate conversion information, the arrangement information and access information of the three-dimensional object, and the three-dimensional object-specifying information.

Furthermore, the file processing unit 203 receives the input of the measurement result of the transmission band from the measurement unit 202. Then, the file processing unit 203 selects the segment file of the bitstream to be reproduced on the basis of the parsing result of the scene description and the information indicating the transmission band acquired from the measurement unit 202, and the like. Then, the file processing unit 203 outputs the information of the segment file of the selected bitstream to the file acquisition unit 201. At this time, by changing the segment file of the bitstream selected according to the transmission band, adaptive distribution according to the bit rate is realized.

Thereafter, the file processing unit 203 receives the input of the segment file of the selected bitstream from the file acquisition unit 201. Then, the file processing unit 203 extracts the data of the bitstream from the segment file of the acquired bitstream and outputs it to the decode processing unit 204. Furthermore, the file processing unit 203 acquires information as to whether the three-dimensional object exists by using the acquired three-dimensional object-specifying information, and outputs the information to the display control unit 205.

The decode processing unit 204 receives the input of bitstream data from the file processing unit 203. Then, the decode processing unit 204 performs decode processing on the acquired bitstream data. Thereafter, the decode processing unit 204 outputs the decoded bitstream data to the display information generation unit 206.

The display control unit 205 receives input of information regarding the viewpoint position and the line-of-sight direction of the operator from an input apparatus, which is not shown. Then, the display control unit 205 outputs the acquired information regarding the viewpoint position and the viewpoint direction to the display information generation unit 206.

Furthermore, the display control unit 205 receives the input of the information as to what kind of three-dimensional object exists from the file processing unit 203. The operator can also input designation information indicating a noticeable three-dimensional object by using the input apparatus instead of the viewpoint position and line-of-sight information. The display control unit 205 acquires the designation information indicating the noticeable three-dimensional object designated by the operator. Then, for example, in the case of viewing that tracks a three-dimensional object, the display control unit 205 outputs the information regarding the viewpoint position and the viewpoint direction to the display information generation unit 206 so as to track the three-dimensional object designated by the designation information over time. Therefore, for example, it is possible to display an image that tracks the three-dimensional object designated by the operator. Furthermore, for example, in a case where the position of the three-dimensional object is displayed, the display control unit 205 generates information for specifying the designated three-dimensional object from the 6DoF content.

The display information generation unit 206 receives the scene description, the decoded bitstream data, and the acquired information regarding the viewpoint position and the viewpoint direction, and generates display information. The details of the display information generation unit 206 will be described below.

The input of the data of the bitstream is received from the decode processing unit 204. Then, the display information generation unit 206 arranges the three-dimensional object, which is the acquired bitstream data, in the three-dimensional space on the basis of the scene description. Moreover, the display information generation unit 206 receives the input of the information regarding the viewpoint position and the line-of-sight direction of the operator from the display control unit 205. Then, the display information generation unit 206 renders the three-dimensional object arranged in the three-dimensional space according to the viewpoint position and the line-of-sight direction, and generates a display image. Thereafter, the display information generation unit 206 supplies the generated display image to the display unit 207.

Furthermore, for example, in a case where the position of the three-dimensional object is displayed, the display information generation unit 206 acquires information for specifying the designated three-dimensional object acquired from the display control unit 205 from the 6DoF content. Then, the display information generation unit 206 adds the information displaying the position of the three-dimensional object designated by using the acquired information to the display image.

The display unit 207 includes a display apparatus such as a monitor. The display unit 207 receives the input of the display image generated by the display information generation unit 206. Then, the display unit 207 causes the display apparatus to display the acquired display image.

File Generation Procedure According to the First Embodiment

Figure 7:
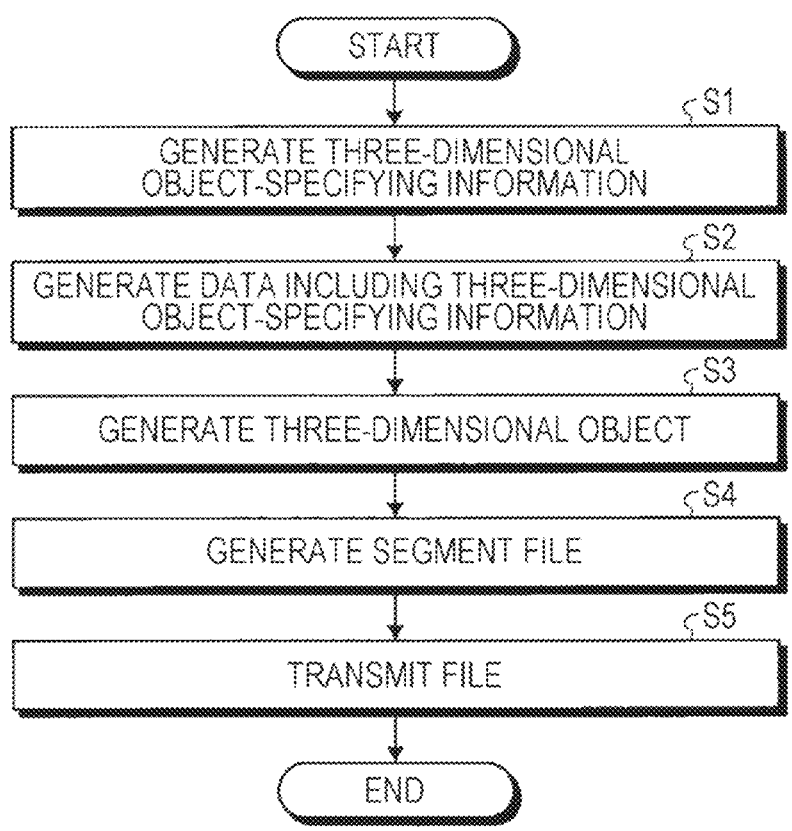
FIG. 7 is a flowchart of file generation processing by a file generation apparatus according to the first embodiment.

The file generation apparatus 1 generates a scene graph, which is scene composition information, indicating the composition of a scene of 6DoF content including three-dimensional object in the three-dimensional space. Next, with reference to FIG. 7, the flow of the file generation processing by the file generation apparatus 1 according to the first embodiment will be described in detail. FIG. 7 is a flowchart of the file generation processing by a file generation apparatus according to the first embodiment.

The preprocessing unit 102 generates three-dimensional object-specifying information (step S1). In the present embodiment, the preprocessing unit 102 generates three-dimensional object-specifying information stored in the scene description format.

Then, the preprocessing unit 102 generates data including the three-dimensional object-specifying information (step S2).

Next, the encode unit 103 encodes the data including the three-dimensional object-specifying information to generate a bitstream of the three-dimensional object (step S3). Furthermore, the encode unit 103 encodes the acquired scene graph and generates a scene description.

Next, the file generation unit 104 stores the acquired bitstream in the ISOBMFF file for each segment and generates the segment file of the bitstream. Furthermore, the file generation unit 104 stores the data of the scene description in the ISOBMFF file for each segment and generates the segment file of the scene description (step S4).

The transmission unit 105 outputs the segment file generated by the file generation unit 104 to the Web server 3 (step S5).

Reproduction Processing Procedure According to the First Embodiment

Figure 8:
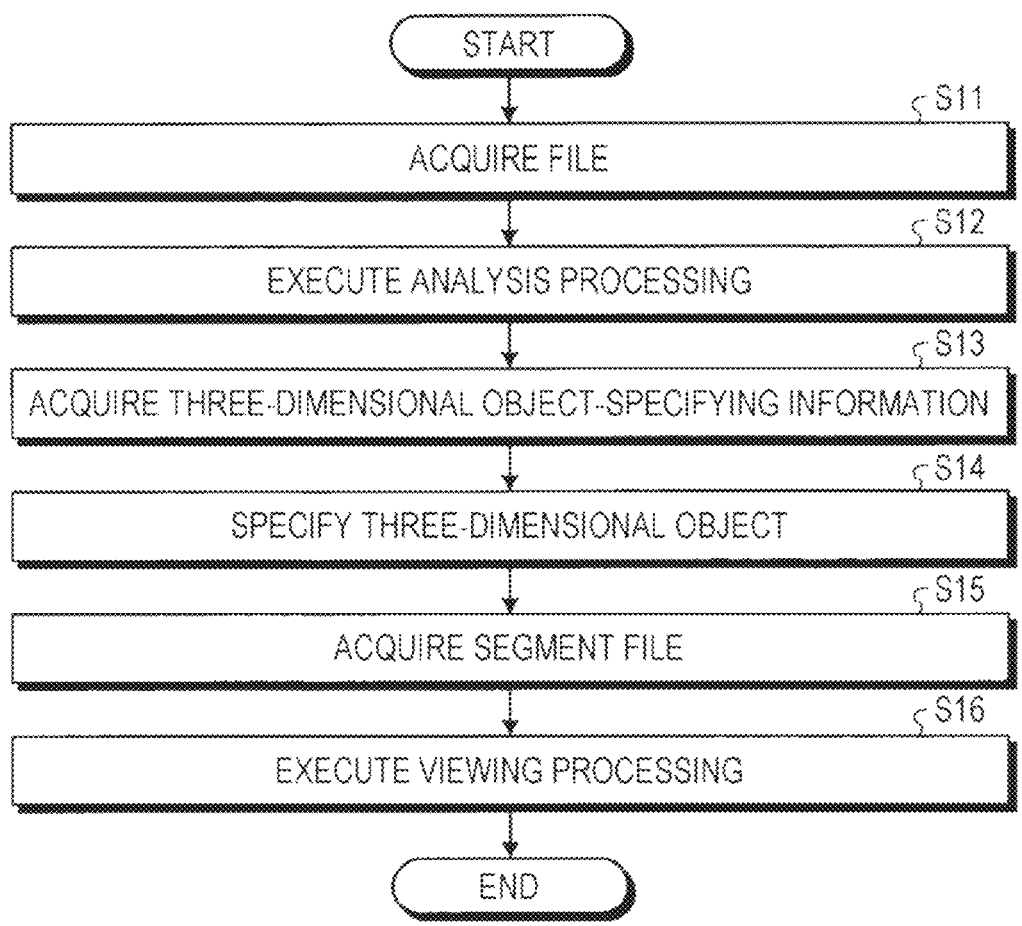
FIG. 8 is a flowchart of reproduction processing executed by a client apparatus according to the first embodiment.

Next, the flow of the reproduction processing executed by the client apparatus 2 according to the present embodiment will be described with reference to FIG. 8. FIG. 8 is a flowchart of the reproduction processing executed by the client apparatus according to the first embodiment.

The file acquisition unit 201 acquires the MPD file corresponding to the 6DoF content to be reproduced from the Web server 3 (step S11)

The file processing unit 203 parses the MPD file and executes analysis processing (step S12). Then, the file processing unit 203 specifies the scene description of the 6DoF content to be reproduced on the basis of the analysis result.

Then, the file acquisition unit 201 acquires the scene description specified by the file processing unit 203. The file processing unit 203 parses the scene description acquired by the file acquisition unit 201. Therefore, the file processing unit 203 acquires the three-dimensional object-specifying information (step S13).

Then, the file processing unit 203 specifies an existing three-dimensional object from the acquired three-dimensional object-specifying information (step S14). The file processing unit 203 outputs information as to what kind of three-dimensional object exists to the display control unit 205.

Furthermore, the file processing unit 203 acquires the segment file of the bitstream corresponding to the 6DoF content to be reproduced on the basis of the parsing result (step S15). The decode processing unit 204 performs decode processing on the segment file of the bitstream. Thereafter, the decode processing unit 204 outputs the bitstream data to the display information generation unit 206.

The display control unit 205 outputs the input information regarding the viewpoint position and the line-of-sight direction or the information regarding the viewpoint position and the line-of-sight direction obtained from the designation information of the noticeable three-dimensional object to the display information generation unit 206. The display information generation unit 206 executes viewing processing that renders the three-dimensional object and adds the position information by using the information regarding the viewpoint position and the line-of-sight direction acquired from the display control unit 205 to generate a display image, and causes the display unit 207 to display it (step S16).

As described above, the file generation apparatus according to the present embodiment generates the three-dimensional object-specifying information for specifying the three-dimensional object included in the 6DoF content using the space-based expression method, and stores it in the 6DoF content. Therefore, the client apparatus can specify the three-dimensional object included in the 6DoF content using the space-based expression method. That is, in the distribution system according to the present embodiment, it is possible to provide viewing that automatically tracks the three-dimensional object selected by the operator and display the position of the three-dimensional object to assist the operator's viewing. Thus, it is possible to provide the user with a viewing experience with a high degree of freedom.

1.1-1 VARIATION EXAMPLE (1-1) OF THE FIRST EMBODIMENT

In the first embodiment, the three-dimensional object-specifying information is stored in the scene description format, but in the present variation example, the three-dimensional object-specifying information is stored in the user description format, which is the MPEG-21 standard, which is different from the first embodiment. The details of storing the three-dimensional object-specifying information by the preprocessing unit 102 of the file generation apparatus 1 according to the present variation example will be described below.

The preprocessing unit 102 according to the present variation example generates a file in a user silkription format indicating three-dimensional object-specifying information, which is a file different from the scene description. That is, the preprocessing unit 102 stores the three-dimensional object-specifying information in the user description. FIG. 9 is a diagram indicating an example of the syntax in a case where three-dimensional object-specifying information is stored in a user description format.

For example, the preprocessing unit 102 adds an XML schema indicating three-dimensional object-specifying information as shown in FIG. 9. The preprocessing unit 102 stores the three-dimensional object-specifying information as one piece of attribute information of the user description in the XML schema. In this case, the preprocessing unit 102 defines new Type of Service Description indicating the position information and detailed information of the three-dimensional object.

In FIG. 9, id is the identification information of the three-dimensional object and is indicated by a numerical value. Furthermore, centerPointX, centerPointY, and centerPointZ are values indicating coordinates (x, y, z) indicating the center point of the three-dimensional object. bboxSizeX, bboxSizeY, and bboxSizeZ are values indicating the circumscribed box of the three-dimensional object, and are indicated by lengths parallel to each axis about centerPoint. description is a character string showing detailed information of the three-dimensional object.

In the above, the preprocessing unit 102 uses the circumscribed box of the three-dimensional object to indicate the position of the three-dimensional object, but the preprocessing unit 102 may indicate the position of the three-dimensional object by a solid such as a circumscribed sphere or a circumscribed cylinder. In addition, the preprocessing unit 102 may store the shape information itself of the three-dimensional object.

1.1-2 VARIATION EXAMPLE (1-2) OF THE FIRST EMBODIMENT

In the present variation example, the three-dimensional object-specifying information is stored in a unique format, which is different from the first embodiment. The details of storing the three-dimensional object-specifying information by the preprocessing unit 102 of the file generation apparatus 1 according to the present variation example will be described below.

The preprocessing unit 102 stores the three-dimensional object-specifying information in a unique format different from the scene description and the user description. That is, the preprocessing unit 102 stores the three-dimensional object-specifying information in a unique description. FIG. 10 is a diagram indicating an example of the syntax in a case where three-dimensional object-specifying information is stored in a unique format.

For example, as in the syntax shown in FIG. 10, the preprocessing unit 102 defines an object metadata structure and indicates identification information, position information, and detailed information of a three-dimensional object to be written in the defined object metadata structure.

In FIG. 10, num_of_objects is a value indicating the number of three-dimensional objects. object_id is the identification information of the three-dimensional object and is indicated by a numerical value. Furthermore, centerPointX, centerPointY, and centerPointZ are values indicating coordinates (x, y, z) indicating the center point of the three-dimensional object, and are indicated by an integer part of 24 bits and a decimal part of 8 bits. bboxSizeX, bboxSizeY, and bboxSizeZ are values indicating the circumscribed box of the three-dimensional object, and are indicated by lengths parallel to each axis about centerPoint. bboxSizeX, bboxSizeY, and bboxSizeZ are also indicated by an integer part of 24 bits and a decimal part of 8 bits. description is a character string showing detailed information of the three-dimensional object.

Moreover, in the above, the circumscribed box of the three-dimensional object is used to indicate the position of the three-dimensional object, but the preprocessing unit 102 may indicate the position of the three-dimensional object by a solid such as a circumscribed sphere or a circumscribed cylinder. In addition, the preprocessing unit 102 may store the shape information itself of the three-dimensional object.

1.2-1 VARIATION EXAMPLE (2-1) OF THE FIRST EMBODIMENT

Next, a method of storing data indicating three-dimensional object-specifying information will be described. In the present variation example, a case where the three-dimensional object-specifying information does not change in units of time will be described. The case where the three-dimensional object-specifying information does not change in units of time is, in other words, the case where the position information of the three-dimensional object does not change.

The file generation apparatus 1 according to the present variation example stores data indicating the three-dimensional object-specifying information in a newly defined box. The generation of a file storing the data indicating the three-dimensional object-specifying information according to the present variation example will be described below. Here, the case of using the data indicating the three-dimensional object-specifying information indicated in the scene description format will be described. However, in a case where the user description format is used or in a case where a unique format is used, it is also possible to generate a file storing the data indicating the three-dimensional object-specifying information by a similar method.

FIG. 11 is a diagram showing an example of a box for storing data indicating three-dimensional object-specifying information in variation example (2-1) of the first embodiment. The file generation unit 104 according to the present variation example newly defines StaticObjectMetadataBox shown in FIG. 11. The file generation unit 104 stores StaticObjectMetadataBox in the sample entry of any track of a scene description track, a mesh track, or a texture track of the three-dimensional object. In particular, the scene description track is a file acquired by the client apparatus 2 at the initial stage of the reproduction processing. Therefore, by including the data indicating the three-dimensional object-specifying information in the scene description track, the three-dimensional object-specifying information can be acquired at the initial stage of the reproduction processing, so that there is an advantage that the processing related to the three-dimensional object can be performed quickly.

Furthermore, the file generation unit 104 may store the data indicating the three-dimensional object-specifying information in MetaBox. For example, the file generation unit 104 may store StaticObjectMatadata in ItemData by setting item_type to "obmt" in ItemInfoEntry. In this case, the file generation unit 104 may extend ItemProperty to ItemProperty('somd') and store StaticObjectMetadata.

Figure 12:
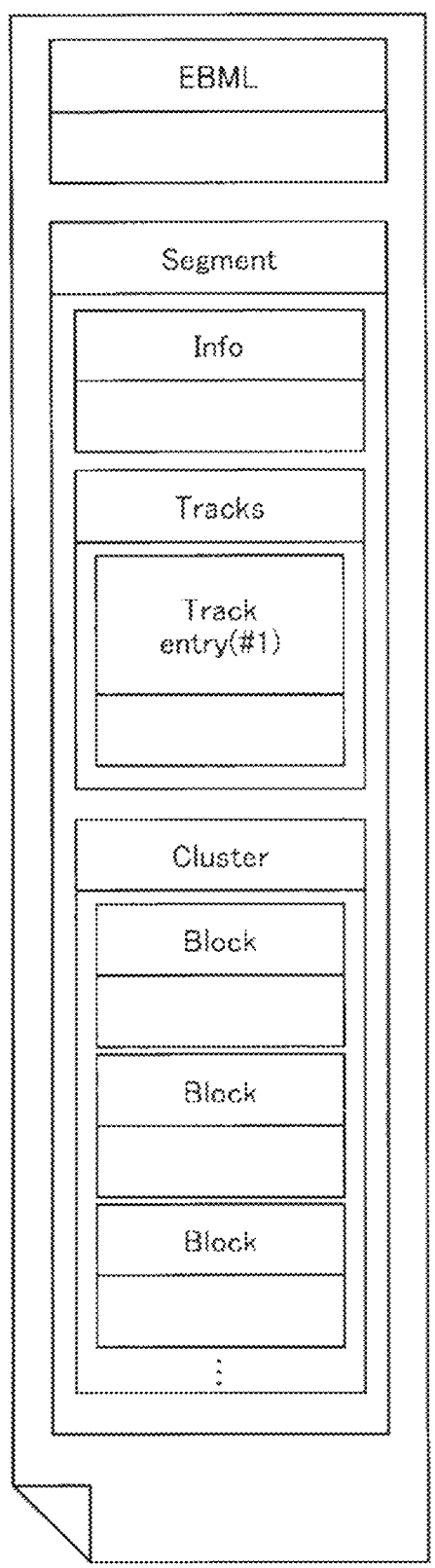
FIG. 12 is a diagram indicating the format of Matroska Media Container.

The case of storing in ISOBMFF has been described above. However, even in a case where transmission is performed using Matroska Media Container shown in FIG. 12, it is possible to transmit the data indicating the three-dimensional object-specifying information. FIG. 12 is a diagram indicating the format of Matroska Media Container. In that case, the file generation unit 104 newly stores SceneDescriptionObjectMetadata element in Track Entry element. At this time, the file generation unit 104 sets Element Type to binary and stores SceneDescriptionObject-Metadata( ) as binary data as EBML data.

1.2-2 VARIATION EXAMPLE (2-2) OF THE FIRST EMBODIMENT

In the present variation example, a method of storing the data indicating the three-dimensional object-specifying information in a case where the three-dimensional object-specifying information changes in units of time will be described. The case where the three-dimensional object-specifying information changes in units of time is, in other words, the case where the position information changes such that the three-dimensional object moves.

The file generation apparatus 1 according to the present variation example defines new Timed metadata and stores the data indicating the three-dimensional object-specifying information in sample entry. The generation of a file storing the data indicating the three-dimensional object-specifying information according to the present variation example will be described below. Here, the case of using the data indicating the three-dimensional object-specifying information indicated in the scene description format will be described. However, in a case where the user description format is used or in a case where a unique format is used, it is also possible to generate a file storing the data indicating the three-dimensional object-specifying information by a similar method.

Figure 13:
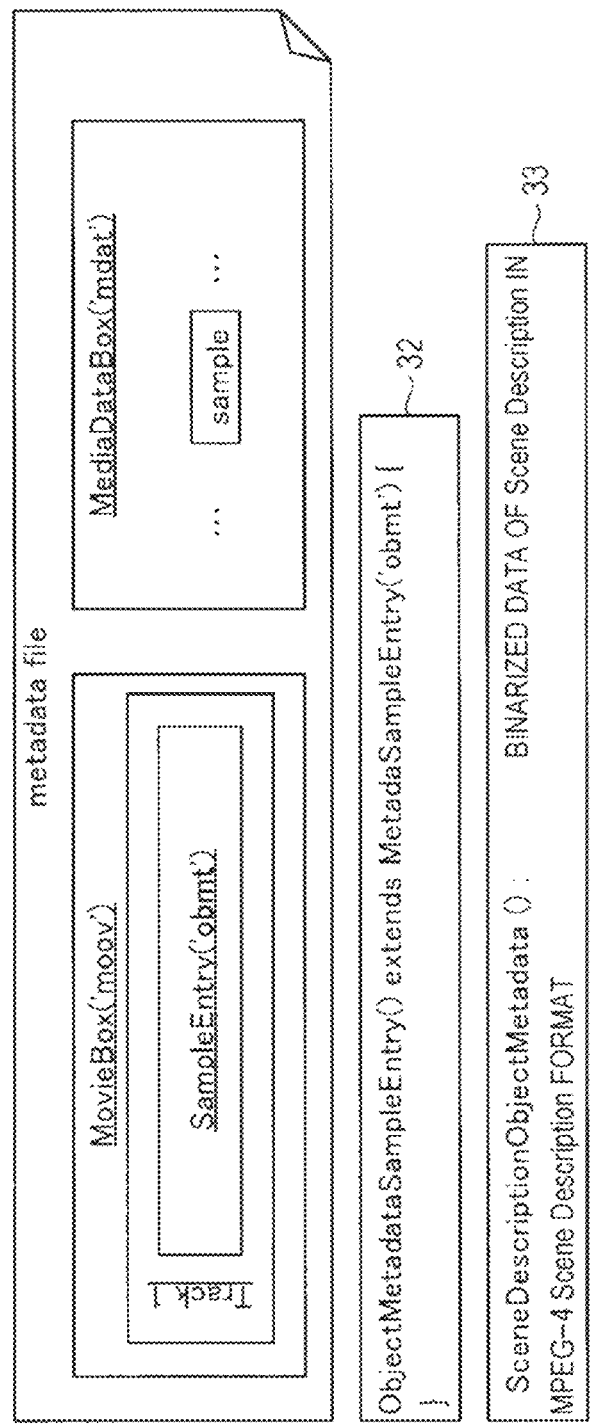
FIG. 13 is a diagram indicating an example of storing data indicating three-dimensional object-specifying information and an example of the syntax in variation example (2-2) of the first embodiment.

FIG. 13 is a diagram indicating an example of storing data indicating three-dimensional object-specifying information and an example of the syntax in variation example (2-2) of the first embodiment. The file generation unit 104 creates metadata file for storing the scene description showing the three-dimensional object-specifying information shown in FIG. 13 as a file different from the existing file. Then, as shown in a syntax 32, the file generation unit 104 newly defines ObjectMetadataSampleEntry('obmt') and stores a scene description indicating the three-dimensional object-specifying information in MetadataSampleEntry. In this case, the file generation unit 104 stores the three-dimensional object-specifying information for each time indicated by a syntax 33 in sample.

Moreover, in a case where the mesh data and the texture data of the three-dimensional object are stored in tracks in one ISOBMFF file together with the three-dimensional object-specifying information, the file generation unit 104 stores the information as described below. For example, the file generation unit 104 stores the ID of the mesh data track of the three-dimensional object with reference Type='cdsc', which stores Track Reference Box in a three-dimensional object-specifying information track. Although cdsc is an existing storage area, the file generation unit 104 may change to another value indicating a new relationship, such as providing a track for position information of the three-dimensional object.

Here, in a case where the three-dimensional object-specifying information that changes for each time and the three-dimensional object-specifying information that does not change for each time are mixed, the file generation unit 104 arranges StaticObjectMetadata in ObjectmetadataSampleEntry.

The case of storing in ISOBMFF has been described above. However, even in a case where transmission is performed using Matroska Media Container, it is possible to transmit the data indicating the three-dimensional object-specifying information. In that case, the file generation unit 104 can transmit the three-dimensional object-specifying information by setting sample of FIG. 13 to the data structure of a Cluster block of Matroska Media Container. In that case, the file generation unit 104 newly defines Metadata=19 in TrackType element included in TrackEntry element, and newly specifies M_OBMT in CodecID element.

1.2-3 VARIATION EXAMPLE (2-3) OF THE FIRST EMBODIMENT

In the present variation example, another method of storing the data indicating the three-dimensional object-specifying information in a case where the three-dimensional object-specifying information changes in units of time will be described. The file generation apparatus 1 according to the present variation example stores the data indicating the three-dimensional object-specifying information in ISOBMFF. The generation of a file storing the data indicating the three-dimensional object-specifying information according to the present variation example will be described below. Here, the case of using the data indicating the three-dimensional object-specifying information indicated in the scene description format will be described.

Figure 14:
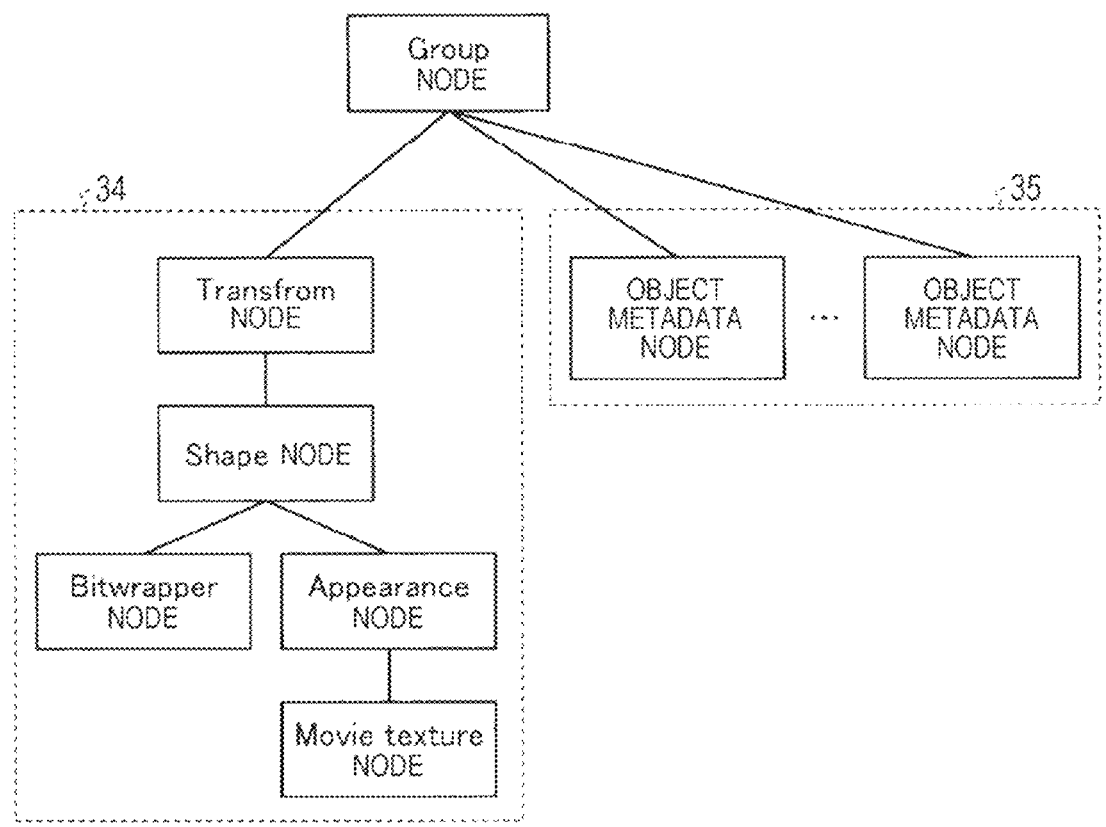
FIG. 14 is a diagram indicating an example of storing data indicating three-dimensional object-specifying information in variation example (2-3) of the first embodiment.

The file generation unit 104 stores the three-dimensional object-specifying information in the scene description of a scene description file. FIG. 14 is a diagram indicating an example of storing data indicating three-dimensional object-specifying information in variation example (2-3) of the first embodiment. As shown in FIG. 14, the file generation unit 104 places a Group node at the root, and sets a scene graph 34 of the original 6DoF content and a scene graph 35 storing the three-dimensional object-specifying information as child nodes.

Here, the client apparatus 2 executes acquisition of the scene description file in a case where the 6DoF content is reproduced. Therefore, in the method of storing the data indicating the three-dimensional object-specifying information according to the present variation example, the client apparatus 2 that does not use the three-dimensional object-specifying information acquires unnecessary three-dimensional object-specifying information, and there is a possibility that the transmission band becomes wasted.

1.3-1 VARIATION EXAMPLE (3-1) OF THE FIRST EMBODIMENT

In the present variation example, a method of showing three-dimensional object-specifying information using MPD in a case where the three-dimensional object-specifying information does not change in units of time will be described. The file generation apparatus 1 according to the present variation example indicates the three-dimensional object-specifying information by AdaptationSet corresponding to the scene description or the three-dimensional object. The method of showing the three-dimensional object-specifying information using MPD according to the present variation example will be described below.

FIG. 15 is a diagram indicating an example of the syntax of AdaptationSet according to variation example (3-1) of the first embodiment. MPD is a file that stores information indicating what kind of data is included in 6DoF content. Then, in AdaptationSet held by MPD, the scene description, the mesh data, and the texture data are shown separately.

As shown in FIG. 15, the file generation unit 104 indicates the data indicating the three-dimensional object-specifying information by using SupplementalProperty in AdaptationSet. SupplementalProperty is information indicating the content of AdaptationSet. The file generation unit 104 newly defines schemeIdUri="StaticObjectMetadata" using SupplementalProperty, and indicates the identification information for each three-dimensional object by SOM:meta of its child element.

In FIG. 15, id is the identification information of the three-dimensional object and is indicated by a numerical value. centerPointX, centerPointY, and centerPointZ are values indicating coordinates (x, y, z) indicating the center point of the three-dimensional object. bboxSizeX, bboxSizeY, and bboxSizeZ are values indicating the circumscribed box of the three-dimensional object, and are indicated by lengths parallel to each axis about centerPoint. In a case where the circumscribed box is not used and omitted, bboxSizeX, bboxSizeY, and bboxSizeZ are set to (−1, −1, −1). description is a character string showing detailed information of the three-dimensional object.

Here, the identification information of the three-dimensional object may be stored in AdaptationSet of either the scene description or the mesh data or the texture data of the three-dimensional object. Furthermore, although the case of storing in AdaptationSet has been described here, the file generation unit 104 may also store the identification information of the three-dimensional object in Period of MPD.

1.3-2 VARIATION EXAMPLE (3-2) OF THE FIRST EMBODIMENT

In the present variation example, a method of indicating the data indicating the three-dimensional object-specifying information using MPD in a case where the three-dimensional object-specifying information changes in units of time will be described. The file generation apparatus 1 according to the present variation example uses MPD to associate Timed metadata in which the three-dimensional object-specifying information is stored with the scene description or the three-dimensional object. The association of three-dimensional object-specifying information using MPD in the present variation example will be described below.

FIG. 16 is a diagram indicating an example of the syntax of MDP in variation example (3-2) of the first embodiment. As shown in FIG. 16, the file generation unit 104 designates "obmt" in AdaptationSet@codecs in AdaptationSet of the three-dimensional object-specifying information and indicates that it is three-dimensional object-specifying information in a Timed metadata format. Then, the file generation unit 104 indicates Representation@id of the scene description including the three-dimensional object in Representation@association. Moreover, the file generation unit 104 sets Representation@associationType to "cdsc" which is the same as reference Type storing Track Reference Box designated in variation example (2-2) of the first embodiment.

In addition, the file generation unit 104 may clearly indicate the case where the scene description data includes the three-dimensional object-specifying information as in variation example (2-3) of the first embodiment. For example, the file generation unit 104 can clearly indicate that the three-dimensional object-specifying information is included in the scene description data by storing <SupplementalProperty schemeIDUri="IncludeObjectMetadata"> in AdaptationSet of the scene description.

The file generation apparatus according to the present variation example generates a file for storing the three-dimensional object-specifying information and provides the file to the client apparatus by the method described in each of the above variation examples. Therefore, the client apparatus can acquire the three-dimensional object-specifying information, and can provide the user with a viewing experience with a high degree of freedom.

Furthermore, in the above description, although the description has been made using the MPEG-4 scene description, the method of storing the three-dimensional object-specifying information can be applied even in a case where another scene description is used.

2. SECOND EMBODIMENT

In a case where 6DoF content is provided by using a space-based method, when the object cannot be identified, even if the operator wants to focus on a specific object and view it with high quality, it is difficult to provide a high quality image of the designated object. Therefore, the file generation apparatus according to the present embodiment provides a video obtained by making a specific three-dimensional object high-definition. A high-definition method for a specific three-dimensional object will be described below. The file generation apparatus according to the present embodiment is also indicated by the block diagram of FIG. 2.

The preprocessing unit 102 of the file generation apparatus 1 generates one space-based three-dimensional object including the entire 6DoF content in which a specific three-dimensional object is made to have high definition. Then, the preprocessing unit 102 generates high-definition three-dimensional object-specifying information indicating the high-definition three-dimensional object for each of the generated space-based three-dimensional objects.

The details of generation of the high-definition three-dimensional object-specifying information will be described below. The preprocessing unit 102 according to the present embodiment stores the high-definition three-dimensional object-specifying information in the scene description format. FIG. 17 is a diagram indicating an example of syntax of a node of a scene graph including high-definition three-dimensional object information. As shown in FIG. 17, the preprocessing unit 102 shows a high-definition three-dimensional object by using the identification information indicated by the three-dimensional object-specifying information. The preprocessing unit 102 enumerates the IDs of highly accurate three-dimensional objects as ids in FIG. 17. In this way, the preprocessing unit 102 stores HighLODObject, which is a node of the high-definition three-dimensional object-specifying information, in the scene graph.

Furthermore, the preprocessing unit 102 may indicate the definition of the three-dimensional object by a numerical value in quality as shown in FIG. 18. FIG. 18 is a diagram indicating an example of the syntax indicating definition together with a high-definition three-dimensional object. As quality in FIG. 18, the definition of each three-dimensional object is indicated by a numerical value in the order of identification information enumerated in ids. The value of quality is defined, for example, so that the smaller the value, the higher the definition.

In addition, the preprocessing unit 102 may store the three-dimensional object-specifying information in the scene description format as shown in FIG. 4 similarly to the first embodiment, and add highLODflag to the three-dimensional object-specifying information to indicate that it is high definition.

As described above, the file generation apparatus according to the present embodiment generates a space-based three-dimensional object obtained by making a specific three-dimensional object included in the 6DoF content high-definition, and generates the high-definition three-dimensional object-specifying information indicating a high-definition three-dimensional object for each space-based three-dimensional object. By acquiring the high-definition three-dimensional object-specifying information, the client apparatus can acquire the space-based three-dimensional object obtained by making a specific three-dimensional object high-definition and provide it to the operator. That is, the operator can view the video obtained by making the designated three-dimensional object high-definition, and can enjoy viewing with a higher degree of freedom.

2.1-1 VARIATION EXAMPLE (1-1) OF THE SECOND EMBODIMENT

The preprocessing unit 102 according to the present variation example generates Visual3DObjectInfo shown in FIG. 9 and stores the three-dimensional object-specifying information in the user description format. Moreover, the preprocessing unit 102 stores the high-definition three-dimensional object-specifying information in the user description format. That is, the preprocessing unit 102 stores the high-definition three-dimensional object-specifying information in the user description. FIG. 19 is a diagram indicating an example of the syntax in a case where high-definition three-dimensional object-specifying information is stored in a user description format.

As shown in FIG. 19, the preprocessing unit 102 adds an XML schema so that it can be designated as one piece of attribute information of the user description. In FIG. 19, id is the identification information of the high-definition three-dimensional object and is indicated by a numerical value. For this id, id shown in Visual3DObjectInfo in FIG. 9 is used.

Furthermore, the preprocessing unit 102 may indicate the definition by a numerical value in quality as shown in FIG. 20. FIG. 20 indicates an example of the syntax in a case where definition is stored together with a high-definition three-dimensional object in a user description format. The definition of the three-dimensional object is indicated by a numerical value in quality in FIG. 20. The value of quality is defined, for example, so that the smaller the value, the higher the definition.

In addition, the preprocessing unit 102 may add highLODflag to Visual3DObjectInfo shown in FIG. 9 to indicate that the three-dimensional object designated by Visual3DObjectInfo has high definition.

2.1-2 VARIATION EXAMPLE (1-2) OF THE SECOND EMBODIMENT

The preprocessing unit 102 according to the present variation example generates Objectmetadata shown in FIG. 10 and stores the three-dimensional object-specifying information in a unique format. Moreover, the preprocessing unit 102 stores the high-definition three-dimensional object-specifying information in a unique format. That is, the preprocessing unit 102 stores the high-definition three-dimensional object-specifying information in a unique description. FIG. 21 is a diagram indicating an example of the syntax in a case where high-definition three-dimensional object-specifying information is stored in a unique format.

As shown in FIG. 21, the preprocessing unit 102 newly defines a HighQualityObject structure. Then, the preprocessing unit 102 stores the high-definition three-dimensional object-specifying information in the HighQualityObject structure. In FIG. 21, num_object indicates the number of high-definition three-dimensional objects. Furthermore, High_LOD_object_id is the identification information of the high-definition three-dimensional object and is indicated by a numerical value. For this id, object_id shown in object-metadata in FIG. 10 is used.

Furthermore, the preprocessing unit 102 may indicate the definition of the three-dimensional object by a numerical value in quality as shown in FIG. 22. FIG. 22 is a diagram indicating an example of the syntax in a case where definition is stored together with a high-definition three-dimensional object in a unique format. The preprocessing unit 102 indicates the definition of the three-dimensional object in LOD_value in FIG. 22. The value of LOD_value is defined, for example, so that the smaller the value, the higher the definition.

In addition, the preprocessing unit 102 may add highLODflag to objectmetadata shown in FIG. 10 to indicate that the three-dimensional object designated by objectmetadata has high definition.

2.2-1 VARIATION EXAMPLE (2-1) OF THE SECOND EMBODIMENT

In the present variation example, a method of storing the data indicating the high-definition three-dimensional object-specifying information in a case where the high-definition three-dimensional object-specifying information does not change in units of time will be described. Here, the case of using the data indicating the high-definition three-dimensional object-specifying information indicated in the scene description format will be described. However, in a case where the user description format is used or in a case where a unique format is used, it is possible to generate a file storing the data indicating the high-definition three-dimensional object-specifying information by a similar method.

FIG. 23 is a diagram showing an example of a box for storing data indicating high-definition three-dimensional object-specifying information in variation example (2-1) of the second embodiment. The file generation unit 104 according to the present variation example newly defines StaticHighLODObjectBox shown in FIG. 23. The file generation unit 104 stores StaticHighLODObjectBox in the sample entry of any track of a scene description track, a mesh track, or a texture track of the three-dimensional object.

Furthermore, the file generation unit 104 may store the data indicating the high-definition three-dimensional object-specifying information in MetaBox. For example, the file generation unit 104 may store StaticHighLODObjectBox in ItemData by setting item type to "obmt" in ItemInfoEntry. In this case, the file generation unit 104 may extend ItemPropery to ItemPropery('shlo') and store StaticHighLODObjectBox.

The case of storing in ISOBMFF has been described above. However, even in a case where transmission is performed using Matroska Media Container shown in FIG. 12, it is possible to transmit the data indicating the high-definition three-dimensional object-specifying information. In that case, the file generation unit 104 newly stores SceneDescriptionHighLODObject element in Track Entry element. At this time, the file generation unit 104 sets Element Type to binary and stores SceneDescriptionHigh-LODObject( ) as binary data as EBML data.

2.2-2 VARIATION EXAMPLE (2-2) OF THE SECOND EMBODIMENT

In the present variation example, a method of storing the data indicating the high-definition three-dimensional object-specifying information in a case where the three-dimensional object-specifying information changes in units of time will be described.

Here, similarly to variation example (2-2) of the first embodiment, the file generation unit 104 creates metadata file for storing the scene description showing the three-dimensional object-specifying information shown in FIG. 13 as a file different from the existing file.

Then, the file generation unit 104 stores the high-definition three-dimensional object-specifying information at the same time as the three-dimensional object-specifying information in sample of metadata file. In the case of simultaneous storage, the file generation unit 104 may generate a file so that the three-dimensional object-specifying information and the high-definition three-dimensional object-specifying information can be accessed separately. Furthermore, the file generation unit 104 may have a structure in which the high-definition three-dimensional object-specifying information is included in the three-dimensional object-specifying information.

As another method, the file generation unit 104 may define new Timed metadata for the high-definition three-dimensional object-specifying information and store the high-definition three-dimensional object-specifying information therein. In that case, the file generation unit 104 extends MetadataSampleEntry in newly defined Timed metadata to new HighLODObjectSampleEntry('hobm'). Moreover, the file generation unit 104 stores the high-definition three-dimensional object-specifying information in sample. In this case, the file generation unit 104 may store Track Reference Box in a high-definition three-dimensional object-specifying information track and register id of the three-dimensional object-specifying information with reference_type='cdsc' in order to show the relationship with object_id of Timed metadata of ObjectMetadata. cdsc is an existing value, but may be replaced with another value indicating a new relationship.

Furthermore, in a case where the high-definition three-dimensional object-specifying information that changes in units of time and the high-definition three-dimensional object-specifying information that does not change in units of time are mixed, the file generation unit 104 arranges StaticHighLODObjectBox of FIG. 23 in the high-definition three-dimensional object-specifying information track or an object-specifying track with regard to the high-definition three-dimensional object-specifying information that does not change in units of time.

2.3-1 VARIATION EXAMPLE (3-1) OF THE SECOND EMBODIMENT

In the present variation example, a method of showing high-definition three-dimensional object-specifying information using MPD in a case where the three-dimensional object-specifying information does not change in units of time will be described.

FIG. 24 is a diagram indicating an example of the syntax of AdaptationSet according to variation example (3-1) of the second embodiment. As shown in FIG. 24, the file generation unit 104 indicates the data indicating the high-definition three-dimensional object-specifying information by using SupplementalProperty in AdaptationSet. The file generation unit 104 newly defines schemeIdUri="StaticHighLOCObject" using Supplemental-Property, and stores information indicating the data including the three-dimensional object-specifying information including the identification information and the identification information of the high-definition three-dimensional object by its child element. In FIG. 24, id is the identification information of the three-dimensional object and is indicated by a numerical value. Furthermore, objectMetadata indicates Representation@id including the three-dimensional object-specifying information.

Moreover, the file generation unit 104 may store the information indicating the definition of the three-dimensional object in AdaptationSet by using quality together with the identification information of the high-definition three-dimensional object.

2.3-2 VARIATION EXAMPLE (3-2) OF THE SECOND EMBODIMENT

In the present variation example, a method of indicating the data indicating the three-dimensional object-specifying information using MPD in a case where the three-dimensional object-specifying information changes in units of time will be described. The file generation unit 104 of the file generation apparatus 1 according to the present variation example designates "hobm" in AdaptationSet@codecs in AdaptationSet of the three-dimensional object-specifying information and indicates that it is high-definition three-dimensional object-specifying information in a Timed metadata format. Then, the file generation unit 104 indicates Representation@id of the scene description including the high-definition three-dimensional object in Representation@associationId. Moreover, the file generation unit 104 sets Representation@associationType to "cdsc" which is the same as reference Type storing Track Reference Box designated in variation example (2-2) of the second embodiment.

2.4 VARIATION EXAMPLE (4) OF THE SECOND EMBODIMENT

In the present variation example, the scene description is extended so that access information indicating the high-definition three-dimensional object can be acquired from the scene description. FIG. 25 is a diagram showing an extended scene description according to variation example (4) of the second embodiment.

The file generation unit 104 of the file generation apparatus 1 according to the present variation example extends a BitWrapper node including the access information to the mesh data of the three-dimensional object and provides field for storing a plurality of pieces of Adaptation@id as shown in a syntax 36. Furthermore, the file generation unit 104 extends a MovieTexture node including the access information to the texture data of the three-dimensional object, and provides field for storing a plurality of pieces of Adaptation@id as shown in a syntax 37. AdaptatioSetIdSelection in FIG. 25 indicates a plurality of pieces of AdaptationSet including the mesh data or the texture data of the three-dimensional object by AdaptationSet@id. Therefore, the client apparatus 2 can access AdaptationSet that indicates the high-definition three-dimensional object-specifying information from the scene description.

As another method, the file generation unit 104 may indicate a plurality of pieces of AdaptationSet@id in url query parameter of url in the scene description.

2.5 VARIATION EXAMPLE (5) OF THE SECOND EMBODIMENT

In the above, one space-based three-dimensional object obtained by making a specific three-dimensional object high-definition is generated. In that case, when there are many three-dimensional objects that are to be made high-definition in the generation of 6DoF content, a space-based three-dimensional object is created for each three-dimensional object, which will increase the generation cost and the amount of data on the server. Therefore, it is preferable to adopt the method described below in order to reduce the generation cost and the amount of data on the server.

Figure 26:
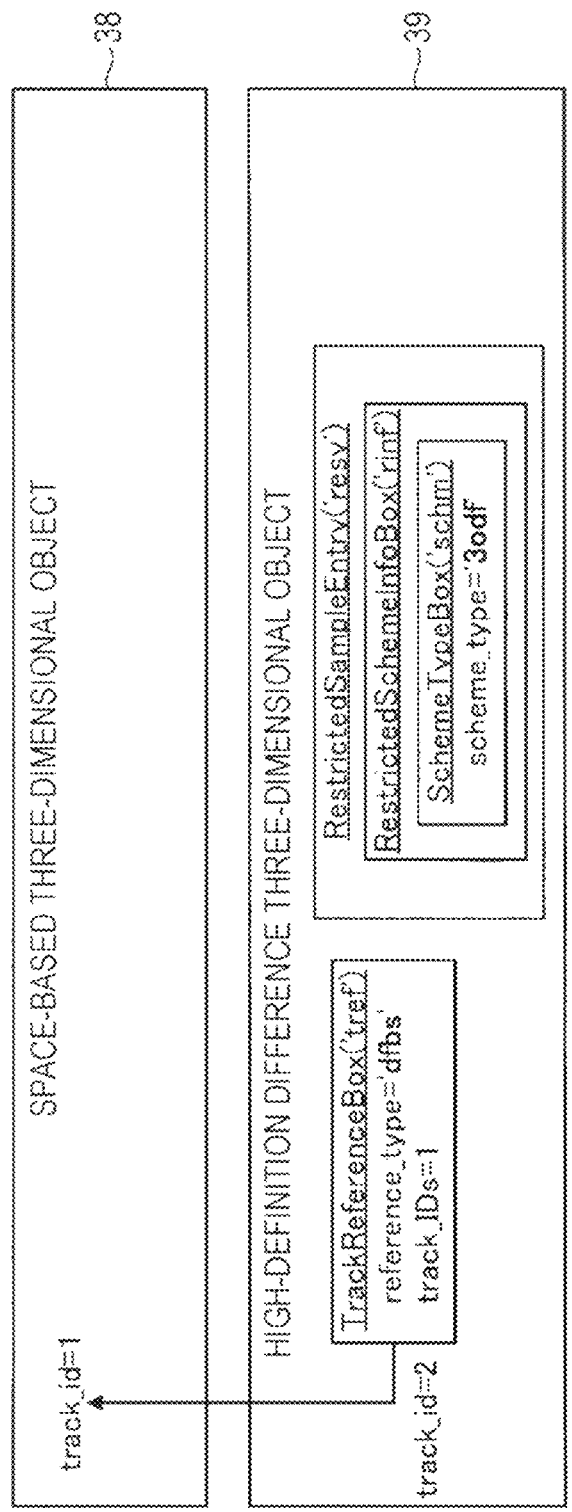
FIG. 26 is a diagram indicating an example of an ISOBMFF file in a case where a high-definition difference three-dimensional object is used.

In the present variation example, a high-definition difference three-dimensional object, which is a three-dimensional object including only the difference information for making a specific three-dimensional object high-definition, is used to generate a video obtained by making the specific three-dimensional object high-definition. FIG. 26 is a diagram indicating an example of an ISOBMFF file in a case where a high-definition difference three-dimensional object is used.

The file generation unit 104 generates a space-based three-dimensional object 38 for the entire three-dimensional space shown in FIG. 26. Moreover, the file generation unit 104 generates a high-definition difference three-dimensional object 39 that indicates the difference between the space-based three-dimensional object of the entire three-dimensional space and the space-based three-dimensional object obtained by making a specific three-dimensional object high-definition. The space-based three-dimensional object 38 can be reproduced independently, but the high-definition difference three-dimensional object 39 is reproduced as a set with the space-based three-dimensional object 38.

Specifically, the file generation unit 104 defines new reference_type='dfbs' in Track Reference Box in generating the high-definition difference three-dimensional object and indicates a track of the space-based three-dimensional object 38, which is the source of the difference. Moreover, the file generation unit 104 indicates that it is difference data by newly registering scheme_Type='3odf' in SchemeTypeBox of RestrictedSchemeInfoBox in the high-definition difference three-dimensional object. Furthermore, the file generation unit 104 may store the high-definition three-dimensional object-specifying information indicated in variation examples (2-1) and (2-2) of the second embodiment in the track of the high-definition difference three-dimensional object.

Furthermore, in this case, the file generation unit 104 stores the information indicating the high-definition difference three-dimensional object in MPD by the method described below. For example, the file generation unit 104 sets AdaptationSet@codecs of the high-definition difference three-dimensional object to "resv.3dof.xxxx" (xxxx indicates a codec encoding the three-dimensional object) to indicate that it is a high-definition difference three-dimensional object. Furthermore, the file generation unit 104 uses Representation@dependencyid of the high-definition difference three-dimensional object to indicate Representation@id of the space-based three-dimensional object, which is the source of the difference. In addition, a high-definition three-dimensional object may be shown by AdaptationSet of a high-definition difference object by using the syntaxes of variation examples (3-1) and (3-2) of the second embodiment.

The client apparatus 2 acquires the space-based three-dimensional object and the high-definition difference three-dimensional object, and decodes and renders the objects to generate a three-dimensional object obtained by making a specific three-dimensional object high-definition.

Note that in a case where transmission is performed by using Matroska Media Container shown in FIG. 12, the file generation unit 104 newly stores Base3DObjectTrackID element in Track Entry element of the high-definition difference three-dimensional object for high definition. At this time, the file generation unit 104 sets Element Type to unsigned int and stores TrackNumber of the track of the space-based three-dimensional object, which is the source of the difference, as EBML data.

In this way, the amount of data on the server can be reduced by using the difference three-dimensional object data for high definition. Furthermore, by acquiring a plurality of pieces of difference data, it is possible to make a plurality of three-dimensional objects high-definition, and it is possible to improve the degree of freedom in viewing by the operator.

2.6 VARIATION EXAMPLE (6) OF THE SECOND EMBODIMENT

Figure 27:
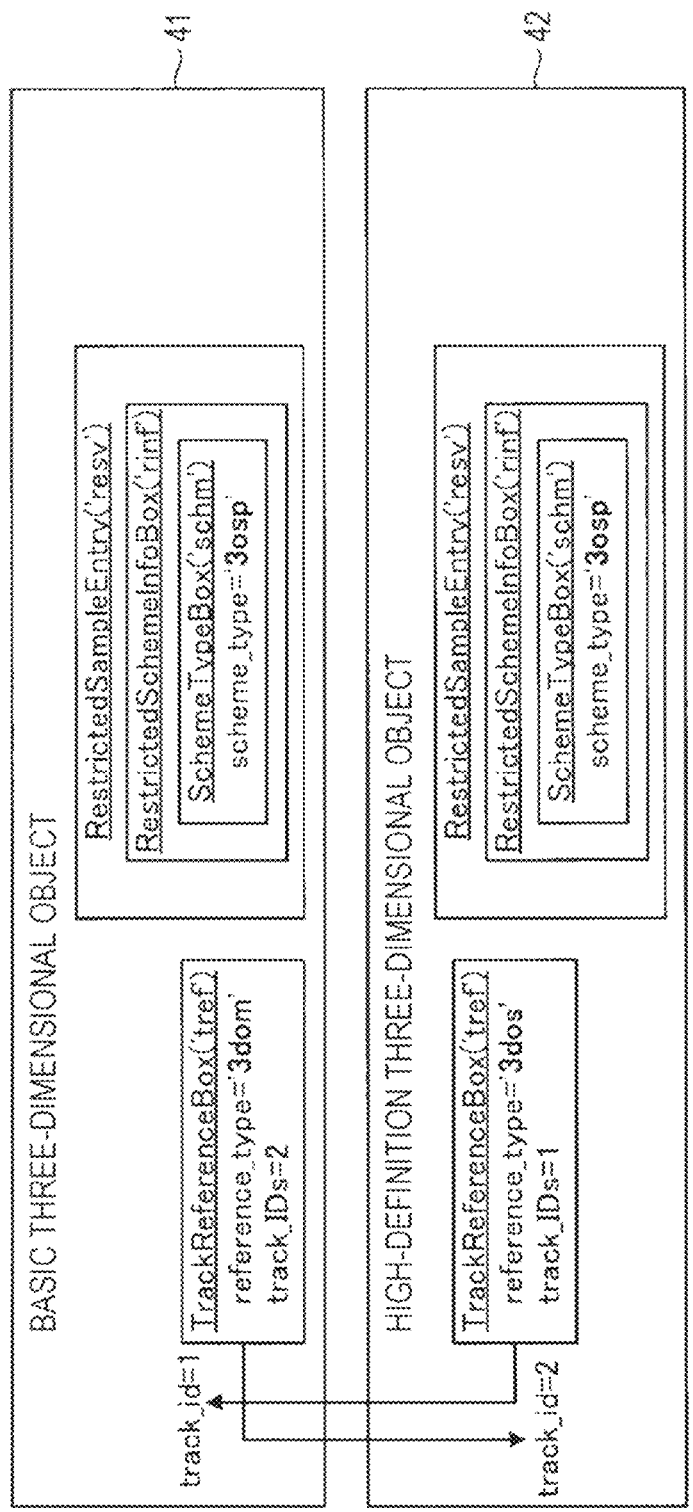
FIG. 27 is a diagram indicating an example of an ISOBMFF file in a case where a basic three-dimensional object is used.

In the present variation example, a basic three-dimensional object, which is obtained when a specific three-dimensional object is excluded from the space-based three-dimensional object that indicates the entire 6DoF content, and a high-definition three-dimensional object that indicates a high-definition specific three-dimensional object are used to generate a video obtained by making the specific three-dimensional object high-definition. FIG. 27 is a diagram indicating an example of an ISOBMFF file in a case where a basic three-dimensional object is used.

As shown in FIG. 27, the file generation unit 104 generates a basic three-dimensional object 41 in which a specific three-dimensional object does not exist in the entire target three-dimensional space. Furthermore, the file generation unit 104 generates a high-definition three-dimensional object 42 obtained by making a specific three-dimensional object high-definition. In this case, the basic three-dimensional object 41 and the high-definition three-dimensional object 42 are reproduced as a set.

The file generation unit 104 treats the track of the basic three-dimensional object 41 as a base track, newly defines reference_type='3dom' in Track Reference box of the basic three-dimensional object 41, and indicates a list of three-dimensional objects used for reproduction. Then, the file generation unit 104 performs access information to the three-dimensional object file from the scene description on the file including the base track.

Furthermore, the file generation unit 104 stores information indicating that the entire target three-dimensional space includes a plurality of three-dimensional objects in both tracks of the basic three-dimensional object 41 and the high-definition three-dimensional object 42. For example, the file generation unit 104 stores newly defined scheme_type='3osp' for indicating that it is a part of the data in SchemeTypeBox of RestrictedSchemeInfoBox of both tracks. Furthermore, the file generation unit 104 newly defines reference_type='3dos' in Track Reference Box in the track of the high-definition three-dimensional object 42, and indicates the base track of the entire three-dimensional space. Note that the syntax of variation example (2-2) of the second embodiment may be used for the track of the high-definition three-dimensional object 42.

Furthermore, in this case, the file generation unit 104 stores the information indicating the high-definition difference three-dimensional object in MPD by the method described below. For example, the file generation unit 104 sets AdaptationSet@codecs of the high-definition difference three-dimensional object to "resv.3dof.xxxx" (xxxx indicates a codec encoding the three-dimensional object) to indicate that the entire target three-dimensional space includes a plurality of three-dimensional objects. Furthermore, the file generation unit 104 uses Representation@dependencyId of the basic three-dimensional object, which is the base of a target three-dimensional space, to indicate Representation@id of all the other high-definition three-dimensional objects used for rendering. Furthermore, the file generation unit 104 uses Representation@dependencyId of the high-definition three-dimensional object to indicate Representation@id of the basic three-dimensional object, which is the base.

The client apparatus 2 acquires the basic three-dimensional object and the high-definition three-dimensional object, and decodes and renders the objects to generate a three-dimensional object obtained by making a specific three-dimensional object high-definition.

Note that in a case where transmission is performed by using Matroska Media Container shown in FIG. 12, the file generation unit 104 newly stores required3DObjectTrackID element in Track Entry element of the basic three-dimensional object, which is the base. At this time, the file generation unit 104 sets Element Type to unsigned int and stores all TrackNumber of the tracks of three-dimensional objects that do not exist in the track as EBML data. Furthermore, the file generation unit 104 newly stores Base3DObjectTrackID element in Track Entry element of the high-definition three-dimensional object, which is not the base. At this time, the file generation unit 104 sets Element Type to unsigned int and stores TrackNumber of the track of the basic three-dimensional object, which is the base, as EBML data.

In this way, the amount of data on the server can be reduced by using the three-dimensional object obtained when a three-dimensional object to be made high-definition is excluded from the target three-dimensional space and high-definition three-dimensional object. Furthermore, by using a plurality of pieces of data of the high-definition three-dimensional object, it is possible to make a plurality of three-dimensional objects high-definition, and it is possible to improve the degree of freedom in viewing by the operator.

2.7-1 VARIATION EXAMPLE (7-1) OF THE SECOND EMBODIMENT

In variation example (5) of the second embodiment and variation example (6) of the second embodiment, the high-definition three-dimensional object is used, and in such case, the file generation apparatus provides three-dimensional object-specifying information of each three-dimensional object included in a target three-dimensional space in order to enable selection of a configuration for viewing by making a specific three-dimensional object high-definition from a plurality of configurations. In the present variation example, a case where a plurality of configurations is stored in one scene description will be described. In the present variation example, the three-dimensional object-specifying information of the three-dimensional object included in each configuration is stored in the scene description.

Figure 28:
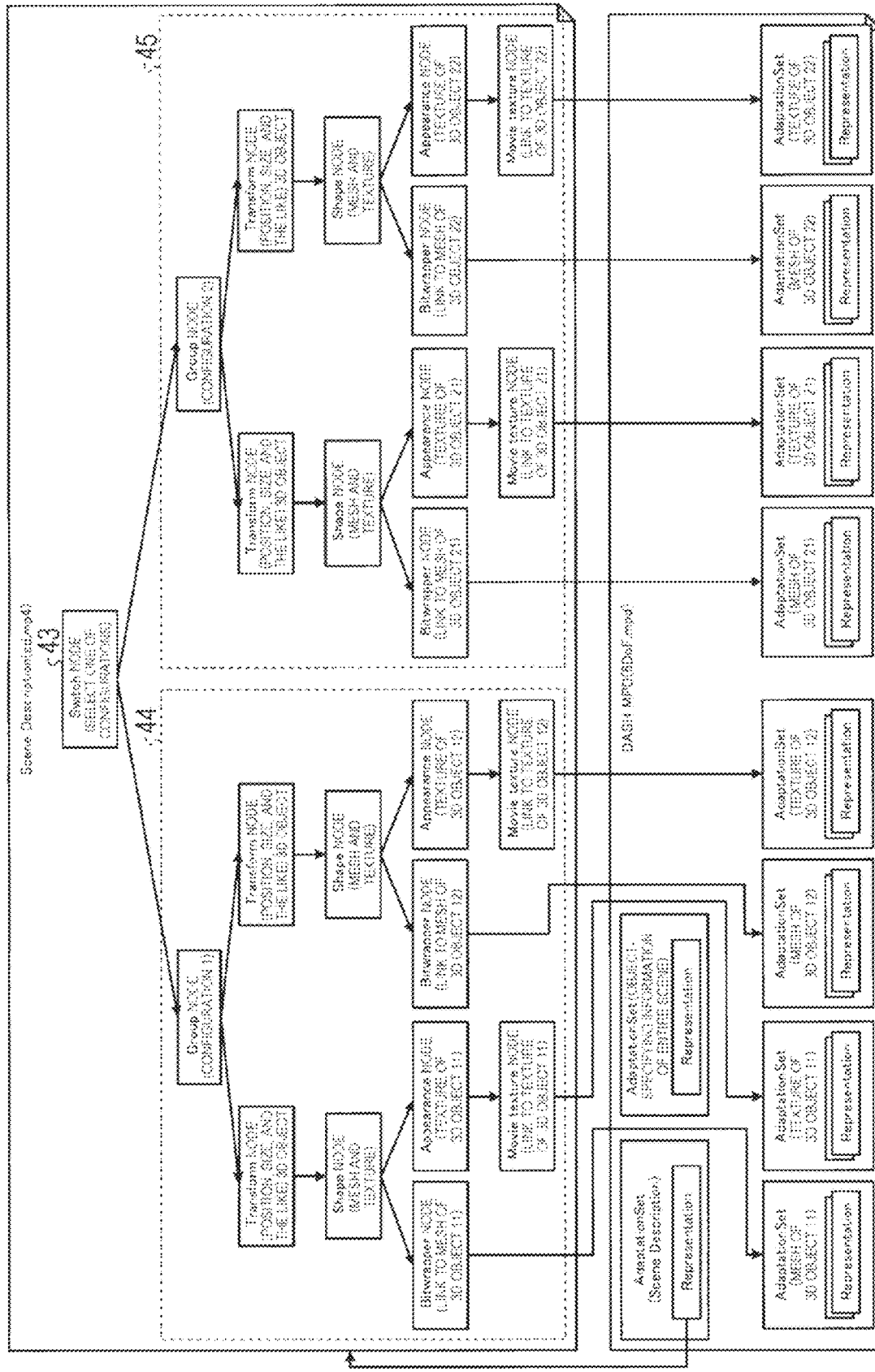
FIG. 28 is a diagram indicating an example of a scene graph in variation example (7-1) of the second embodiment.

FIG. 28 is a diagram indicating an example of a scene graph in variation example (7-1) of the second embodiment. In this case, the file generation unit 104 indicates, for example, as shown in FIG. 28, three-dimensional-specifying information included in each three-dimensional object in the scene description. Specifically, the file generation unit 104 describes a plurality of configurations in one scene description by arranging configurations of different high-definition three-dimensional objects side by side as child nodes of a Switch node 43.

Moreover, as shown in FIG. 29, the file generation unit 104 extends the Switch node 43 and indicates three-dimensional object-specifying information for each three-dimensional object included in each configuration. FIG. 29 is a diagram indicating an example of the syntax of an extended Switch node. ContentStruct in FIG. 29 indicates three-dimensional object-specifying information for each three-dimensional object included in the configuration. The file generation unit 104 uses " ", " " in ContentStruct to separately indicate each three-dimensional object in the configuration. Furthermore, the file generation unit 104 uses the identification information of the three-dimensional object-specifying information of the entire scene as the three-dimensional object-specifying information for specifying the three-dimensional object included in the three-dimensional object. In a case where the three-dimensional object-specifying information includes a plurality of pieces of identification information, the file generation unit 104 uses " " " " to separately indicate each identification information. Moreover, the file generation unit 104 sets the order of nodes to the order of child nodes of the Group node indicating the configuration.

For example, the file generation unit 104 sets the value of ContentStruct to "1, 2 3 4" and "2, 1 3 4". In this case, the value of ContentStruct indicates that the first configuration includes two three-dimensional objects, one of the three-dimensional objects includes "1" and the other of the three-dimensional objects includes "2, 3, 4".

The processing of the client apparatus 2 will be described. The client apparatus 2 receives, for example, a designation of a three-dimensional object to be made high-definition from the operator. Alternatively, the client apparatus 2 selects a three-dimensional object to be made high-definition from the viewing situation of the operator. For example, the client apparatus 2 selects a three-dimensional object closest to the viewpoint position, a three-dimensional object that is the most noticeable by the operator by line-of-sight determination, and the like. Then, the client apparatus 2 specifies the selected three-dimensional object from the three-dimensional object-specifying information of the entire scene.

Next, the client apparatus 2 analyzes the scene description file using the information of the specified three-dimensional object. Then, the client apparatus 2 selects a configuration in which the three-dimensional object selected by using the three-dimensional object-specifying information of the Switch node of the scene graph is made high-definition. Next, the client apparatus 2 displays the selected three-dimensional object with high quality from AdaptationSet of MPD referenced in the scene graph from the selected configuration, and selects AdaptationSet so that the other three-dimensional objects are of low quality.

Therefore, the operator can view a video in which a specific three-dimensional object is made high-definition from a plurality of configurations. The above configuration can be implemented even in a case where the content of the configuration changes dynamically with time. Furthermore, the client apparatus 2 can switch the configuration without switching the scene description file.

In the above, the three-dimensional object-specifying information for each three-dimensional object included in each configuration is stored in the Switch node 43, but the storage location is not limited to this. For example, the file generation unit 104 may arrange ContentsStructureBox shown in FIG. 30 in sample entry of the ISOBMFF file of the scene description, and store the three-dimensional object-specifying information for each three-dimensional object included in each configuration therein. FIG. 30 is a diagram indicating an example of the syntax of ContentsStructureBox.

In FIG. 30, num_contentStruct indicates the number of configurations included. Furthermore, num_3Dobject indicates the number of three-dimensional objects included. Furthermore, num_includingObject indicates the number of objects included in the three-dimensional object. ingcluding_object_id indicates the three-dimensional object-specifying information included in the three-dimensional object. This value is indicated by the identification information used in the three-dimensional object-specifying information of the entire scene. In this case, the file generation unit 104 describes the information regarding each configuration in the same order as the order of child nodes with respect to the Switch node, which is the root.

In this case, the client apparatus 2 specifies a three-dimensional object to be made high-definition from the three-dimensional object-specifying information of the entire scene. Next, the client apparatus 2 acquires ContentStructBox from sample entry when analyzing the scene description file, and determines the configuration to be used by using the specified three-dimensional object-specifying information. Next, the client apparatus 2 analyzes the scene graph and selects the configuration determined in the Switch node.

In this way, by storing the three-dimensional object-specifying information for each three-dimensional object included in each configuration in the ISOBMFF file of the scene description, redundant information can be reduced in a case where the configuration does not change over time.

In addition, as a method of storing in the ISOBMFF file of the scene description, the file generation unit 104 may newly define an IncludingObjectMetadata node shown in FIG. 31 and arrange the node as a child node of the Transform node of each three-dimensional object. FIG. 31 is a diagram indicating an example of the syntax of an IncludingObjectMetadata node. However, the node in which the IncludingObjectMetadata node is arranged is not limited to the Transform node, but may be a child node of another node as long as it is a node indicating an individual three-dimensional object.

In this case, the client apparatus 2 specifies a three-dimensional object to be made high-definition from the three-dimensional object-specifying information of the entire scene. Next, when analyzing the scene description file, the client apparatus 2 also analyzes the scene graph below the Switch node, acquires the three-dimensional object-specifying information, and selects the configuration to be used. In this way, the configuration for storing the three-dimensional object-specifying information of each configuration using the newly defined IncludingObjectMetadata node can be implemented even in a case where the content of the configuration changes dynamically with time.

The case of storing in ISOBMFF has been described above. However, even in a case where transmission is performed using Matroska Media Container shown in FIG. 12, it is possible to store the three-dimensional object-specifying information of each configuration. In that case, the file generation unit 104 newly stores 6DoFContentStruct element in Track Entry element. At this time, the file generation unit 104 sets Element Type to binary and stores ContentStruct( ) shown in FIG. 30 as binary data as EBML data.

In addition, it is possible to set the storage location of the three-dimensional object-specifying information for each three-dimensional object included in each configuration to another location. For example, the file generation unit 104 stores the three-dimensional object-specifying information for each three-dimensional object in SuplementalProperty of AdaptationSet of each three-dimensional object as IncludingObjectMetadata shown in FIG. 32. FIG. 32 is a diagram indicating an example of IncludingObjectMetadata. In FIG. 32, objectMetadata indicates Representation@id including the three-dimensional object-specifying information. ids indicate the three-dimensional object-specifying information included in the three-dimensional object. For the value of ids, the identification information included in the three-dimensional object-specifying information of the entire scene is used.

Furthermore, for example, the file generation unit 104 may store the three-dimensional object-specifying information for each three-dimensional object in sample entry of ISOBMFF of each three-dimensional object as IncludingObjectBox shown in FIG. 33. FIG. 33 is a diagram indicating an example of IncludingObjectBox. In FIG. 33, num_includingObject indicates the number of objects included in the three-dimensional object. including_object_id indicates the three-dimensional object-specifying information included in the three-dimensional object. For the value of including_object_id, the identification information included in the three-dimensional object-specifying information of the entire scene is used.

In a case where an IncludingObjectMetadata node or IncludingObjectBox described above is used, the client apparatus 2 executes analysis of the scene description and analysis of AdaptationSet of the three-dimensional object to be referenced or the file for the selection of the configuration.

The case of storing in ISOBMFF has been described above. However, even in a case where transmission is performed using Matroska Media Container shown in FIG. 12, it is possible to store the three-dimensional object-specifying information of each configuration. In that case, the file generation unit 104 newly stores IncludingObject element in Track Entry element. At this time, the file generation unit 104 sets Element Type to binary and stores IncludingObject( ) shown in FIG. 33 as binary data as EBML data.

Here, some or all of the methods for storing the three-dimensional object-specifying information for each three-dimensional object included in each configuration described in variation example (7-1) of the second embodiment can be used in combination.

2.7-2 VARIATION EXAMPLE (7-2) OF THE SECOND EMBODIMENT

In the present variation example, the three-dimensional object-specifying information for each three-dimensional object included in each configuration is stored in AdaptationSet of MPD. Also in this case, a plurality of configurations is stored in one scene description.

Figure 34:
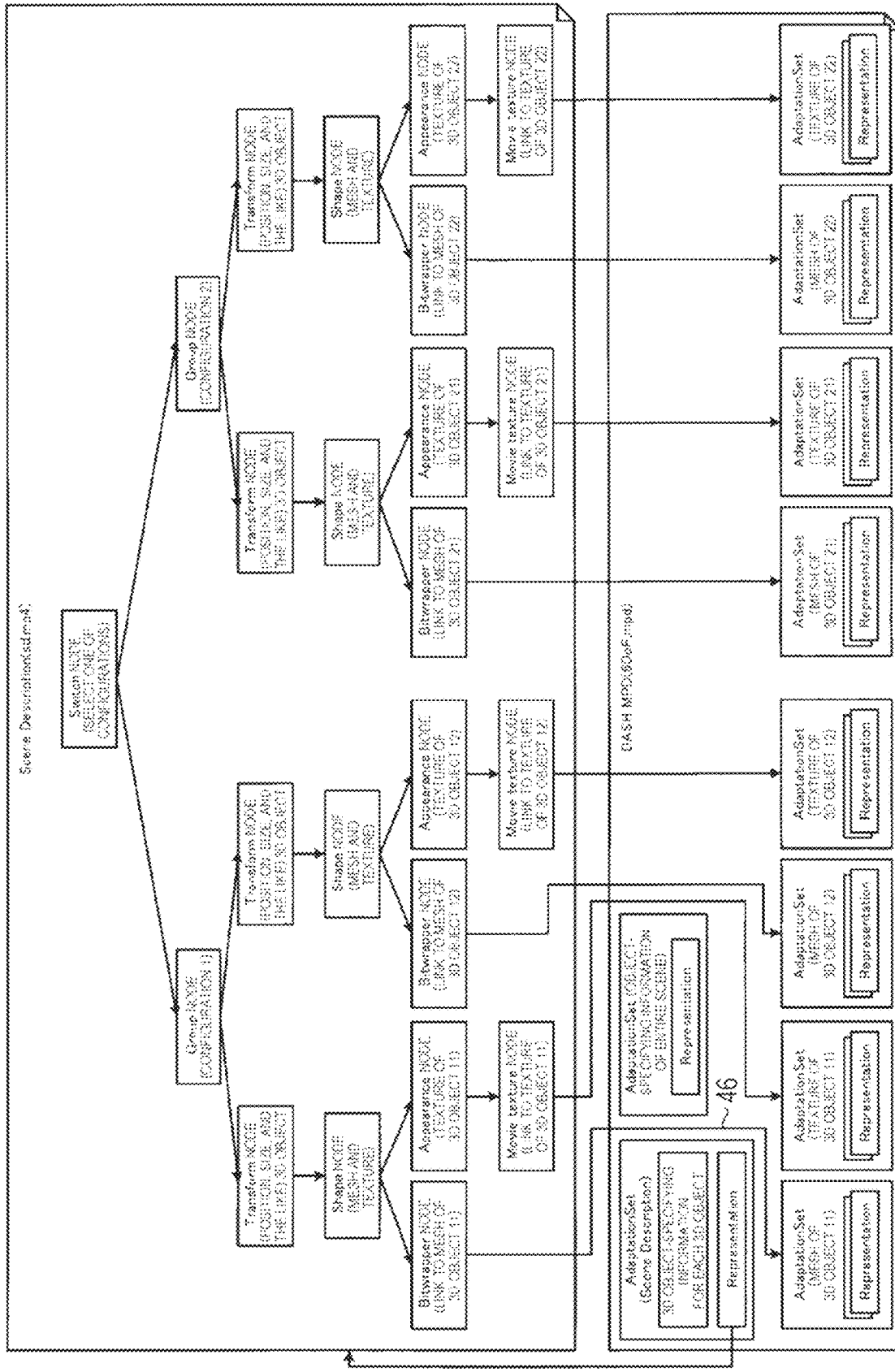
FIG. 34 is a diagram indicating a state in a case where three-dimensional object-specifying information for each three-dimensional object included in each configuration is stored in AdaptationSet of MPD.

The file generation unit 104 according to the present variation example stores the three-dimensional object-specifying information for each three-dimensional object included in each configuration in AdaptationSet 46 of the scene description of MPD as shown in FIG. 34. FIG. 34 is a diagram indicating a state in a case where three-dimensional object-specifying information for each three-dimensional object included in each configuration is stored in AdaptationSet of MPD.

In this case, the file generation unit 104 stores the three-dimensional object-specifying information for each three-dimensional object included in each configuration by using the syntax shown in FIG. 35. FIG. 35 is a diagram indicating an example of the syntax of three-dimensional object-specifying information for each three-dimensional object included in each configuration stored in AdaptationSet. In FIG. 35, OM indicates access information to the three-dimensional object-specifying information to be referenced. objectMetadata indicates Representation@id including the three-dimensional object-specifying information. 3DObject indicates a three-dimensional object included in the configuration. ids indicate the three-dimensional object-specifying information of the three-dimensional object. For the value of ids, the identification information included in the three-dimensional object-specifying information of the entire scene is used. In a case where the value of ids includes a plurality of objects, it is separated by spaces. 6DoFContentStructDescription is described in the order of nodes arranged under the Switch node in the scene description. 3DObject element is described in the order of child nodes of the Group node.

The processing executed by the client apparatus 2 in this case will be described. The client apparatus 2 specifies a three-dimensional object displayed by being made high-definition from the three-dimensional object-specifying information of the entire scene. Next, the client apparatus 2 selects a configuration in which the specified three-dimensional object has high definition from the three-dimensional object-specifying information for each three-dimensional object in AdaptationSet. Next, the client apparatus 2 extracts the selected configuration from the scene graph of the scene description. Then, the client apparatus 2 selects the quality from AdaptationSet in MPD corresponding to the extracted configuration.

In this way, by storing the three-dimensional object-specifying information for each three-dimensional object included in each configuration in AdaptationSet of MPD, the client apparatus 2 can determine whether or not the configuration used is included in the scene description without acquiring the scene description. Therefore, in a case where the configuration used is not included in the scene description, the client apparatus 2 may not analyze the scene description and can reduce the execution of unnecessary processing. Furthermore, the client apparatus 2 can switch the configuration without switching the scene description file. Moreover, redundant information can be reduced in a case where the configuration does not change over time.

Furthermore, it is also possible to use the scene description according to the present variation example in combination with the scene description of variation example (7-1) of the second embodiment.

Figure 36:
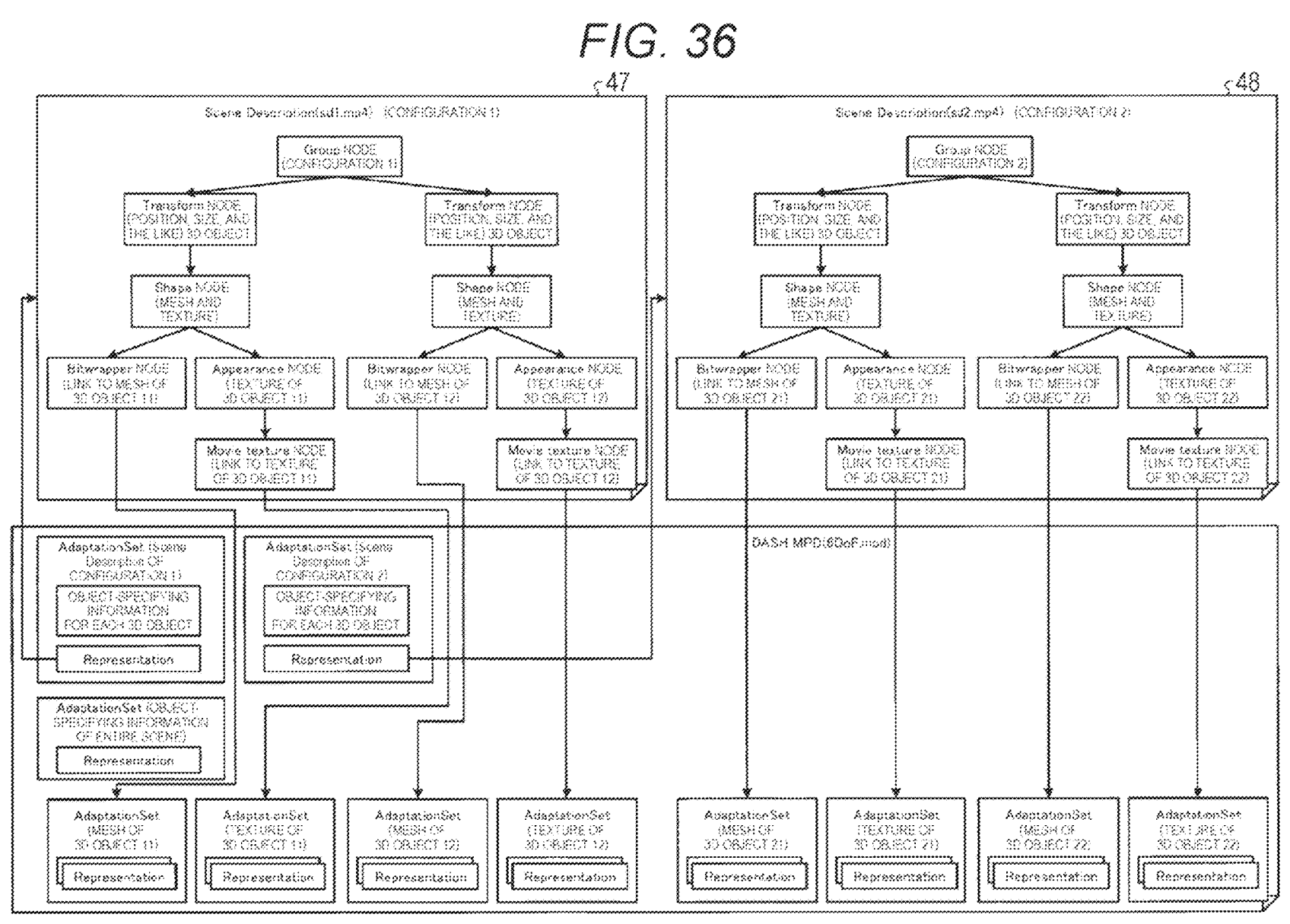

Furthermore, as shown in FIG. 36, the file generation unit 104 can set scenes with different configurations of the three-dimensional object into scene descriptions 47 and 48 to have the file configuration in which different files are provided. FIG. 36 is a diagram indicating a scene graph in a case where the scene description of each configuration is divided. In this case, the file generation unit 104 stores the three-dimensional object-specifying information for each three-dimensional object for selecting the configuration in AdaptationSet corresponding to the scene descriptions 47 and 48. In this case, the file generation unit 104 can store the three-dimensional object-specifying information using the syntax shown in FIG. 35.

In this case, the client apparatus 2 specifies a three-dimensional object displayed by being made high quality from the three-dimensional object-specifying information of the entire scene. Next, the client apparatus 2 selects a configuration in which the specified three-dimensional object has high definition using the three-dimensional object-specifying information for each three-dimensional object stored in AdaptationSet of a plurality of scene descriptions. Next, the client apparatus 2 analyzes the scene description of the selected configuration. Then, the client apparatus 2 selects the quality from AdaptationSet in MPD corresponding to the analyzed scene description.

By separating the scene description for each configuration in this way, the client apparatus 2 can specify the scene description including the configuration to be used without acquiring the scene description. The client apparatus 2 may not analyze the scene description that does not include the configuration to be used, and can reduce unnecessary processing. Furthermore, it is possible to reduce the acquisition of unnecessary scene graphs as compared with the case of storing in AdaptationSet of MPD. Moreover, redundant information can be reduced in a case where the configuration does not change over time. Furthermore, the client apparatus 2 can switch the configuration without switching the scene description file.

Furthermore, although the case of using AdaptationSet of MPD is described here, in a case where the scene description is divided for each configuration, the three-dimensional object-specifying information of the three-dimensional object included in each configuration can also be stored in another location. For example, the file generation unit 104 can also store the three-dimensional object-specifying information of the three-dimensional object included in each configuration by using ContentStructBox of FIG. 30 in sample entry of the scene description of each configuration. In this case, the client apparatus 2 cannot determine the configuration by MPD, but can acquire the three-dimensional object-specifying information of the three-dimensional object included in the configuration by acquiring each scene description file.

The case of storing in ISOBMFF has been described above. However, even in a case where transmission is performed using Matroska Media Container shown in FIG. 12, it is possible to store the three-dimensional object-specifying information of each configuration. In that case, the file generation unit 104 newly stores 6DoFContentStruct element in Track Entry element. At this time, the file generation unit 104 sets Element Type to binary and stores ContentSturuct( ) shown in FIG. 30 as binary data as EBML data.

Furthermore, in the above description, although the description has been made using the MPEG-4 scene description, the method of storing the high-definition three-dimensional object-specifying information can be applied even in a case where another scene description is used.

3. THIRD EMBODIMENT

In a case where 6DoF content is provided by using a space-based method, it is difficult to show the user a noticeable three-dimensional object intended by the content creator unless the object can be identified. Therefore, the file generation apparatus according to the present embodiment provides the user with information regarding the noticeable three-dimensional object intended by the content creator as noticeable object information. The method of providing the noticeable object information will be described below. The file generation apparatus according to the present embodiment is also indicated by the block diagram of FIG. 2.

The preprocessing unit 102 stores the noticeable object information in the scene description format by using the identification information of the three-dimensional object-specifying information.

For example, the preprocessing unit 102 newly defines a node including filed indicated by the syntax shown in FIG. 37, and stores the identification information for determining the three-dimensional object as the noticeable object information. FIG. 37 is a diagram indicating an example of the syntax of a node of noticeable object information. The preprocessing unit 102 enumerates the identification information of the noticeable three-dimensional object in ids in FIG. 37. In this way, the preprocessing unit 102 generates a scene graph using a NoticeableObject node of the noticeable object information.

Furthermore, the preprocessing unit 102 may indicate the noticeability by a numerical value in level as shown in FIG. 38. FIG. 38 is a diagram indicating an example of the syntax showing noticeability together with noticeable object information. In FIG. 38, level indicates the noticeability of each three-dimensional object by a numerical value in the storage order of ids field. For example, the value of level is defined such that the smaller the numerical value, the higher the noticeability.

Here, in the present embodiment, the noticeable object information is stored in the newly specified node, but the preprocessing unit 102 may newly add filed and NoticeableObjectFlag to another node to indicate that it is a noticeable object.

3.1-1 VARIATION EXAMPLE (1-1) OF THE THIRD EMBODIMENT

The preprocessing unit 102 according to the present variation example stores the noticeable object information in the user description format. That is, the preprocessing unit 102 stores the noticeable object information in the user description. The details of the method of storing the noticeable object information in the user description format will be described below.

The preprocessing unit 102 stores the three-dimensional object-specifying information in the user description format by using Visual3DObjectInfo shown in FIG. 9. Moreover, the preprocessing unit 102 adds an XML schema indicating noticeable object information as shown in FIG. 39. FIG. 39 is a diagram indicating an example of the syntax in a case where noticeable object information is stored in a user description format. The preprocessing unit 102 stores specific object information as one piece of attribute information of the user description in the XML schema. The information indicated by element name="id" in FIG. 39 indicates the identification information of the noticeable three-dimensional object. For the value of id, an identifier used in Visual3DObjectInfo is used.

Moreover, the preprocessing unit 102 may add the value of noticeability by setting element name="level" in FIG. 40. FIG. 40 is a diagram indicating an example of the syntax in a case where noticeability is shown together with noticeable object information in a user description format. Level information indicates the noticeability of a three-dimensional object by a numerical value. For example, the value of level is defined such that the smaller the value, the higher the noticeability.

As a method of storing the noticeable object information in the user description format, the preprocessing unit 102 may also add new element and NoticeableObjectFlag indicating that it is a noticeable object to Visual3DObjectInfo.

3.1-2 VARIATION EXAMPLE (1-2) OF THE THIRD EMBODIMENT

The preprocessing unit 102 according to the present variation example stores the noticeable object information in a unique format. That is, the preprocessing unit 102 stores the noticeable object information in a unique description. The details of the method of storing the noticeable object information in a unique format will be described below.

The preprocessing unit 102 defines an ObjectMetadata structure shown in FIG. 10 and stores the three-dimensional object-specifying information in ObjectMetadata thereof. Moreover, as shown in FIG. 41, the preprocessing unit 102 defines a NoticeableObject structure and stores the noticeable object information in NoticeableObject thereof. FIG. 41 is a diagram indicating an example of the syntax in a case where noticeable object information is stored in a unique format. In FIG. 41, num_of_object_id indicates the number of three-dimensional objects. Furthermore, noticeable_object_id indicates a noticeable three-dimensional object, and for its value, object_id in ObjectMetadata is used.

Moreover, the preprocessing unit 102 may add a value of noticeability as shown in FIG. 42. FIG. 42 is a diagram indicating an example of the syntax in a case where noticeability is shown in addition to noticeable object information in a unique format. For example, the value of level in FIG. 42 is defined such that the smaller the value, the higher the noticeability.

As a method of storing the noticeable object information in a unique format, the preprocessing unit 102 may also add new element and NoticeableObjectFlag indicating that it is a noticeable object to ObjectMetadata.

Furthermore, in the third embodiment and its variation examples (1-1) and (1-2), the preprocessing unit 102 can configure the data of the 6DoF content according to the method of using the noticeable object information designated by the content creator. For example, in a case where the content creator designates a change in definition, the preprocessing unit 102 may provide the user with information recommending that the three-dimensional object designated by the noticeable object information be reproduced by changing the definition with respect to another three-dimensional object.

3.2-1 VARIATION EXAMPLE (2-1) OF THE THIRD EMBODIMENT

Next, a method of storing data indicating noticeable object information will be described. In the present variation example, the case where the noticeable object information is stored in ISOBMFF in a case where noticeable object information does not change in units of time will be described.

The file generation unit 104 according to the present variation example stores the noticeable object information in ISOBMFF in a case where the noticeable object does not change in units of time. Here, the case of using the data indicating the noticeable object-specifying information indicated in the scene description format will be described. However, in a case where the user description format is used or in a case where a unique format is used, it is possible to generate a file storing the data indicating the noticeable object-specifying information by a similar method.

The file generation unit 104 defines a new box for storing the noticeable object information and performs storage fixedly in sample entry. FIG. 43 is a diagram showing an example of a box for storing data indicating noticeable object information in variation example (2-1) of the third embodiment. The file generation unit 104 stores StaticNoticeableObjectBox of FIG. 43 in sample entry of either the track of the scene description or the track of the three-dimensional object-specifying information.

As a method of storing the noticeable object information in ISOBMFF in a case where the three-dimensional object-specifying information does not change in units of time, the file generation unit 104 may store the noticeable object information in MetaBox. For example, the file generation unit 104 stores StaticNoticeableObjectBox in ItemData by setting item_type to "obmt" in ItemInfoEntry of MetaBox. In addition, the file generation unit 104 may extend ItemProperty of MetaBox and store StaticNoticeableObjectBox as ItemProper('noob').

The case of storing in ISOBMFF has been described above. However, even in a case where transmission is performed using Matroska Media Container shown in FIG. 12, it is possible to transmit the data indicating the high-definition three-dimensional object-specifying information. In that case, the file generation unit 104 newly stores StaticNoticeableObjectStruct element in Track Entry element. At this time, the file generation unit 104 sets Element Type to binary and stores StaticNoticeableObjectStruct( ) as binary data as EBML data.

3.2-2 VARIATION EXAMPLE (2-2) OF THE THIRD EMBODIMENT

In the present variation example, the case where the noticeable object information is stored in ISOBMFF in a case where the noticeable object information changes in units of time will be described. The file generation unit 104 according to the present variation example stores the noticeable object information in ISOBMFF in a case where the noticeable object changes in units of time.

The file generation unit 104 creates metadata file for storing the scene description showing the three-dimensional object-specifying information shown in FIG. 13 as a file different from the existing file.

Then, the file generation unit 104 stores the noticeable object information at the same time as the three-dimensional object-specifying information in sample of metadata file. In the case of simultaneous storage, the file generation unit 104 may generate a file so that the three-dimensional object-specifying information and the noticeable three-dimensional object information can be accessed separately. Furthermore, the file generation unit 104 may have a structure in which the three-dimensional object-specifying information includes in the noticeable three-dimensional object information.

As another method, the file generation unit 104 may define new Timed metadata for the noticeable three-dimensional object information and store the noticeable three-dimensional object information therein. In that case, the file generation unit 104 extends MetadataSampleEntry in newly defined Timed metadata to new NoticeableObjectSampleEntry(nobm'). Moreover, the file generation unit 104 stores the noticeable three-dimensional object information in sample. In this case, the file generation unit 104 may store Track Reference Box in a noticeable three-dimensional object information track and register id of the three-dimensional object-specifying information with reference_type='cdsc' in order to show the relationship with object_id of Timed metadata of ObjectMetadata. cdsc is an existing value, but may be replaced with another value indicating a new relationship.

Furthermore, in a case where the noticeable object information that changes in units of time and the noticeable object information that does not change in units of time are mixed, the file generation unit 104 arranges StaticNoticeableObjectBox of FIG. 43 in the track of the noticeable object information or an object-specifying track with regard to the noticeable object information that does not change in units of time.

3.3-1 VARIATION EXAMPLE (3-1) OF THE THIRD EMBODIMENT

Next, a case where the noticeable object information or the access information of noticeable object information is stored in MPD will be described. The file generation unit 104 according to the present variation example stores the noticeable object information in the scene description or AdaptationSet of the three-dimensional object in a case where the noticeable object does not change in units of time.

FIG. 44 is a diagram indicating an example of the syntax of MPD for storing noticeable object information. For example, as shown in FIG. 44, the file generation unit 104 stores the noticeable object information by using SupplementalProperty in AdaptationSet of the three-dimensional object. The file generation unit 104 newly defines shemeIdUri="StaticNoticeableObject". Then, the file generation unit 104 stores the information indicating the object-specifying information including the identification information of the three-dimensional object and the noticeable object information therein. In FIG. 43, objectMetadata indicates Representation@id including the object-specifying information. Furthermore, id indicates the identification information of the noticeable three-dimensional object, and for its value, the identification information included in the three-dimensional object-specifying information is used.

Moreover, the file generation unit 104 may store the noticeability by a numerical value together with the noticeable object information in StaticNoticeableObjectDescription shown in FIG. 43.

3.3-2 VARIATION EXAMPLE (3-2) OF THE THIRD EMBODIMENT

Description is given of the file generation unit 104 according to the present variation example storing the noticeable object information to MPD in a case where the noticeable object changes in units of time.

The file generation unit 104 newly defines Timed metadata that stores the noticeable object information. Moreover, the file generation unit 104 associates Timed metadata of the noticeable object information with the scene description or the three-dimensional object related to Timed metadata of the noticeable object information.

Furthermore, in the above description, although the description has been made using the MPEG-4 scene description, the method of storing the noticeable object information can be applied even in a case where another scene description is used.

Although the embodiments of the present disclosure have been described above, the technical scope of the present disclosure is not limited to the above-described embodiments as they are, and various changes can be made without departing from the gist of the present disclosure. Furthermore, the components of different embodiments and variation examples may be combined as appropriate.

Note that the effects described in the present specification are merely illustrative and are not limitative, and other effects may be provided.

Note that the present technology may adopt the configuration described below.

(1) An information processing apparatus including:
a preprocessing unit that generates object-specifying information for identifying a specific object included in a three-dimensional space in a spatial three-dimensional object constituting the three-dimensional space with a plurality of objects as a single three-dimensional object; and
a file generation unit that generates a file including data of the spatial three-dimensional object and the object-specifying information.

(2) The information processing apparatus according to (1), in which the object-specifying information includes identification information, position information, and detailed information of a same object.

(3) The information processing apparatus according to (2), in which the preprocessing unit stores the object-specifying information in any of a node in a scene description, a user description, or a unique description.

(4) The information processing apparatus according to (3), in which the file generation unit stores a description in which the object-specifying information is stored by the preprocessing unit or access information to the description in ISO Base Media File Format (ISOBMFF) or either one or both of a scene description or AdaptationSet corresponding to the specific object of Media Presentation Description (MPD).

(5) The information processing apparatus according to (3), in which in a case where the position information of the specific object changes with time, the file generation unit generates as a scene description file the scene description in which the object-specifying information is stored simultaneously with position information of the spatial three-dimensional object by the preprocessing unit.

(6) The information processing apparatus according to any one of (1) to (5), in which the preprocessing unit generates high-definition object-specifying information including information for specifying a high-definition object having high definition among the objects and definition of the high-definition object.

(7) The information processing apparatus according to (6), in which the preprocessing unit stores the high-definition object-specifying information in any of a scene description, a user description, or a unique description.

(8) The information processing apparatus according to (7), in which the file generation unit stores a description in which the high-definition object-specifying information is stored by the preprocessing unit or access information to the description in either one or both of ISOBMFF or AdaptationSet of MPD.

(9) The information processing apparatus according to (6), in which the preprocessing unit generates difference data for making the high-definition object high-definition and generates information for specifying the difference data.

(10) The information processing apparatus according to (6), in which the preprocessing unit generates high-definition data of the high-definition object and basic data excluding the high-definition object from the three-dimensional space, and generates information for specifying the high-definition data and the basic data.

(11) The information processing apparatus according to (6), in which the preprocessing unit generates information for specifying a partial object included in each of the objects included in the three-dimensional object, and stores the information for specifying the partial object included in each of the objects in either one or both of a scene description or AdaptationSet of MPD.

(12) The information processing apparatus according to any one of (1) to (11), in which the preprocessing unit generates noticeable object information including identification information of a particular noticeable object among the objects and noticeability information of the noticeable object.

(13) The information processing apparatus according to (12), in which the preprocessing unit stores the noticeable object information in any of a scene description, a user description, or a unique description.

(14) The information processing apparatus according to (13), in which the file generation unit stores a description in which the noticeable object information is stored by the preprocessing unit or access information to the description in either one or both of ISOBMFF or AdaptationSet of MPD.

(15) An information processing method causing a computer to execute:
in a spatial three-dimensional object that constitutes a three-dimensional space with a plurality of objects as a single three-dimensional object, generating object-specifying information for identifying a specific object included in the three-dimensional space.

(16) A reproduction processing apparatus including:
a reception unit that receives a file including content of a spatial three-dimensional object that constitutes a three-dimensional space with a plurality of objects as a single three-dimensional object and object-specifying information for identifying a specific object included in the spatial three-dimensional object;
an information processing unit that acquires the object-specifying information from the file received by the reception unit and specifies the specific object from the spatial three-dimensional object on the basis of the acquired object-specifying information; and
a reproduction unit that reproduces the content on the basis of a specifying result by the information processing unit.

(17) A reproduction processing method causing a computer to execute:
receiving a file including content of a spatial three-dimensional object that constitutes a three-dimensional space with a plurality of objects as a single three-dimensional object and object-specifying information for identifying a specific object included in the spatial three-dimensional object;

acquiring the object-specifying information from the received file;

specifying the specific object from the three-dimensional space on the basis of the acquired object-specifying information; and reproducing the content on the basis of a specifying result.

REFERENCE SIGNS LIST

1 File generation apparatus
2 Client apparatus
3 Web server
4 Network
10 Generation processing unit
11 Control unit
20 Reproduction processing unit
21 Control unit
101 Data input unit
102 Preprocessing unit
103 Encode unit
104 File generation unit
105 Transmission unit
201 File acquisition unit
202 Measurement unit
203 File processing unit
204 Decode processing unit
205 Display control unit
206 Display information generation unit
207 Display unit

The invention claimed is:

1. An information processing apparatus comprising:
preprocessing circuitry configured to generate object-specifying information for identifying a specific object included in a three-dimensional space in a spatial three-dimensional object constituting the three-dimensional space with a plurality of objects as a single three-dimensional object; and
file generation circuitry configured to generate a file including data of the spatial three-dimensional object and the object-specifying information, wherein
the object-specifying information includes identification information, position information, and detailed information of a same object,
the preprocessing circuitry is further configured to store the object-specifying information in any of a node in a scene description, a user description, or a unique description, and
under a condition where the position information of the specific object changes with time, the file generation circuitry is further configured to generate as a scene description file the scene description in which the object-specifying information is stored simultaneously with position information of the spatial three-dimensional object by the preprocessing circuitry.

2. The information processing apparatus according to claim 1, wherein
the file generation circuitry is further configured to store a description in which the object-specifying information is stored by the preprocessing circuitry or access information to the description in ISO Base Media File Format (ISOBMFF) or either one or both of a scene description or AdaptationSet corresponding to the specific object of Media Presentation Description (MPD).

3. The information processing apparatus according to claim 1, wherein
the preprocessing circuitry is further configured to generate noticeable object information including identification information of a particular noticeable object among the objects and noticeability information of the noticeable object.

4. The information processing apparatus according to claim 3, wherein
the preprocessing circuitry is further configured to store the noticeable object information in any of a scene description, a user description, or a unique description.

5. The information processing apparatus according to claim 4, wherein
the file generation circuitry is further configured to store a description in which the noticeable object information is stored by the preprocessing circuitry or access information to the description in either one or both of ISOBMFF or AdaptationSet of MPD.

6. An information processing apparatus comprising:
preprocessing circuitry configured to generate object-specifying information for identifying a specific object included in a three-dimensional space in a spatial three-dimensional object constituting the three-dimensional space with a plurality of objects as a single three-dimensional object; and
file generation circuitry configured to generate a file including data of the spatial three-dimensional object and the object-specifying information, wherein
the preprocessing circuitry is further configured to generate high-definition object-specifying information including information for specifying a high-definition object having high definition among the objects and definition of the high-definition object, to generate high-definition data of the high-definition object and basic data excluding the high-definition object from the three-dimensional space, and to generate information for specifying the high-definition data and the basic data.

7. The information processing apparatus according to claim 6, wherein
the preprocessing circuitry is further configured to store the high-definition object-specifying information in any of a scene description, a user description, or a unique description.

8. The information processing apparatus according to claim 7, wherein
the file generation circuitry is further configured to store a description in which the high-definition object-specifying information is stored by the preprocessing circuitry or access information to the description in either one or both of ISOBMFF or AdaptationSet of MPD.

9. The information processing apparatus according to claim 6, wherein
the preprocessing circuitry is further configured to generate difference data for making the high-definition object high-definition and to generate information for specifying the difference data.

10. The information processing apparatus according to claim 6, wherein
the preprocessing is further configured to generate information for specifying a partial object included in each of the objects included in the three-dimensional object, and to store the information for specifying the partial object included in each of the objects in either one or both of a scene description or AdaptationSet of MPD.

11. An information processing method executed by a computer, the method comprising:
in a spatial three-dimensional object that constitutes a three-dimensional space with a plurality of objects as a single three-dimensional object, generating object-specifying information for identifying a specific object included in the three-dimensional space, wherein the object-specifying information includes identification information, position information, and detailed information of a same object;

generating a file including data of the spatial three-dimensional object and the object-specifying information;

storing the object-specifying information in any of a node in a scene description, a user description, or a unique description; and under a condition where the position information of the specific object changes with time, generating as a scene description file the scene description in which the object-specifying information is stored simultaneously with position information of the spatial three-dimensional object by the preprocessing circuitry.

12. A reproduction processing apparatus comprising:

reception circuitry configured to receive a file including content of a spatial three-dimensional object that constitutes a three-dimensional space with a plurality of objects as a single three-dimensional object, and object-specifying information for identifying a specific object included in the spatial three-dimensional object, wherein the object-specifying information includes identification information, position information, and detailed information of a same object, the object-specifying information is stored in any of a node in a scene description, a user description, or a unique description, and under a condition where the position information of the specific object changes with time, the scene description in which the object-specifying information is stored simultaneously with position information of the spatial three-dimensional object is generated as a scene description file;

information processing circuitry configured to acquire the object-specifying information from the file received by the reception circuitry and to specify the specific object from the spatial three-dimensional object on the basis of the acquired object-specifying information; and reproduction circuitry configured to reproduce the content on the basis of a specifying result by the information processing circuitry.

13. A reproduction processing method executed by a computer, the method comprising:

receiving a file including content of a spatial three-dimensional object that constitutes a three-dimensional space with a plurality of objects as a single three-dimensional object, and object-specifying information for identifying a specific object included in the spatial three-dimensional object, wherein the object-specifying information includes identification information, position information, and detailed information of a same object, the object-specifying information is stored in any of a node in a scene description, a user description, or a unique description, and under a condition where the position information of the specific object changes with time, the scene description in which the object-specifying information is stored simultaneously with position information of the spatial three-dimensional object is generated as a scene description file;

acquiring the object-specifying information from the received file;

specifying the specific object from the three-dimensional space on the basis of the acquired object-specifying information; and reproducing the content on the basis of a specifying result.

* * * * *